US011851566B2

(12) United States Patent
Susanna et al.

(10) Patent No.: US 11,851,566 B2
(45) Date of Patent: Dec. 26, 2023

(54) PROCESS FOR PREPARING COMPOUNDS FOR TYRES AND TYRES COMPRISING THEM

(71) Applicant: Pirelli Tyre S.p.A., Milan (IT)

(72) Inventors: Antonio Susanna, Milan (IT); Raffaella Donetti, Milan (IT); Thomas Hanel, Milan (IT); Roberto Scotti, Milan (IT); Barbara Di Credico, Milan (IT); Silvia Mostoni, Milan (IT); Massimiliano D'Arienzo, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 210 days.

(21) Appl. No.: 17/296,064

(22) PCT Filed: Nov. 27, 2019

(86) PCT No.: PCT/IB2019/060223
  § 371 (c)(1),
  (2) Date: May 21, 2021

(87) PCT Pub. No.: WO2020/110023
  PCT Pub. Date: Jun. 4, 2020

(65) Prior Publication Data
  US 2022/0010104 A1  Jan. 13, 2022

(30) Foreign Application Priority Data
  Nov. 28, 2018 (IT) .................. 102018000010654

(51) Int. Cl.
  C08L 9/00   (2006.01)
  C09C 1/30   (2006.01)
  C09C 3/12   (2006.01)
  B60C 1/00   (2006.01)

(52) U.S. Cl.
  CPC .................. C08L 9/00 (2013.01); B60C 1/00 (2013.01); C09C 1/3081 (2013.01); C09C 3/12 (2013.01); C01P 2002/82 (2013.01); C01P 2002/85 (2013.01); C01P 2002/86 (2013.01); C01P 2002/88 (2013.01); C08L 2312/00 (2013.01)

(58) Field of Classification Search
  CPC ..... C08L 9/00; C09C 1/30; C09C 3/12; B60C 1/00
  USPC .......................................................... 523/209
  See application file for complete search history.

(56) References Cited

U.S. PATENT DOCUMENTS

2006/0086450 A1  4/2006  E. Hogan et al.
2008/0194748 A1  8/2008  Futamura

FOREIGN PATENT DOCUMENTS

WO  WO 2012/041804 A2   4/2012
WO  WO-2016174628 A1 * 11/2016 ............... B60C 1/00
WO  WO 2018/210711 A1  11/2018

OTHER PUBLICATIONS

International Search Report form the European Patent Office in corresponding International Application No. PCT/IB2019/060223 dated Feb. 7, 2020.
Written Opinion of the International Searching Authority from the European Patent Office in corresponding International Application No. PCT/IB2019/060223 dated Feb. 7, 2020.
Bresson, C. et al., "Triethoxysilyl-substituted aminoethanethiol ligands for zinc and cadmium complexes and aminoethanethiol-modified silica gel. Evaluation of the corresponding supported molecular trap for metallic pollutant uptake ($Cd^{2+}$, $Hg^{2+}$ and $Pb^{2+}$)", Journal of Environmental Monitoring, vol. 2, No. 3, Jan. 2000, pp. 240-247.
Sharma, R.K. et al., "Zinc(II) complex immobilized on amine functionalized silica gel: a novel, highly efficient and recyclable catalyst for multicomponent click synthesis of 1, 4-disubstituted 1,2,3-triazoles", Journal of Coordination Chemistry, vol. 69, No. 7, Mar. 2016, pp. 1152-1165.
Susanna, A. et al., "Catalytic effect of ZnO anchored silica nanoparticles on rubber vulcanization and cross-link formation-ScienceDirect", European Polymer Journal 93, Aug. 2017, pp. 63-74.
Susanna, A. et al., "ZnO nanoparticles anchored to silica filler. A curing accelerator for isoprene rubber composites", Chemical Engineering Journal, Apr. 2015, vol. 275, pp. 245-252.
Notification of the First Office Action dated Oct. 21, 2022, from China National Intellectual Property Administration, in counterpart Chinese Application No. 201980078231.5.

* cited by examiner

Primary Examiner — Deve V Hall
(74) Attorney, Agent, or Firm — Finnegan, Henderson, Farabow, Garrett & Dunner, L.L.P.

(57) ABSTRACT

The present invention relates to a compound represented by the formula (II): CB-O-ROS-GC-Zn (II) where CB represents the white filler, O represents one or more oxygen bridge bonds, ROS represents an organo-silane residue, GC represents one or more coordinating groups forming a chelate with zinc in ionic form represented by linear, branched or cyclic alkyl chains, comprising one or more heteroatoms inside or at the end of the alkyl chain, and Zn represents zinc in ionic form coordinated with the coordinating groups, a process for the preparation thereof, and the use thereof in the vulcanisation process of elastomeric compounds.

15 Claims, 5 Drawing Sheets

PROCESS FOR PREPARING COMPOUNDS FOR TYRES AND TYRES COMPRISING THEM

FIELD OF THE INVENTION

The present invention relates to a process for preparing elastomeric compounds for tyres with reduced zinc content, characterised by the incorporation of specific modified fillers capable of activating the vulcanisation.

PRIOR ART

In the tyre industry, vulcanisation is a process commonly used to improve the mechanical properties of natural rubber or unsaturated polymers, a process that affects hardness, elasticity, hysteresis of the material at different temperatures and, consequently, behaviour of the tyre on wet as well as friction and abrasion thereof during use.

Over the years, various additives have been proposed to improve the vulcanisation process as vulcanisation activators and accelerants.

In general, with these additives, it is desired to increase the degree and homogeneity of the cross-linking while decreasing the energy and the time required to complete the reaction.

The main vulcanisation activators, capable of increasing the efficiency of the process, are inorganic compounds such as metal oxides and hydroxides, for example ZnO, MgO, $Ca(OH)_2$.

Among the different activators, zinc oxide ZnO is considered the most efficient and is still in use today in many vulcanisation processes. This activator is used in combination with weak organic acids (e.g. stearic acid) which promote the activity thereof in the rubber.

Some studies—see for example the article by Y. Ikeda, et al., *Dinuclear bridging bidentate zinc/stearate complex in sulfur cross-linking of rubber*, Macromolecules 48 (2015) 462-475)—have suggested that $Zn^{2+}$ ions, generated by the interaction of ZnO with stearic acid, interact with the molecules of accelerant and sulphur forming organo-metal complexes that would act as more efficient sulphuring agents. The ability of $Zn^{2+}$ to form these complexes is a key element of the vulcanisation process and strongly depends on the dispersion of ZnO within the polymeric matrix, in turn influenced both by the size of the particles and by the crystalline structure of zinc oxide.

Typically, in the vulcanisation processes of rubbers for tyres, microcrystalline ZnO is used as an activator which however does not readily disperse in the polymeric matrix and reacts only in part with the other vulcanisation agents.

The poor dispersibility and reactivity of the microcrystalline zinc oxide in the elastomeric compound inevitably leads to an overdosing thereof with respect to the amount actually required for cross-linking.

During the use of the tyre, especially due to the abrasion of the tread on the asphalt, the zinc present in the compounds is partly released.

Therefore, out of respect for the environment, over the years it has been tried to reduce the quantity of zinc in the compounds.

For example, it has been tried to use finer ZnO (nanometric particles) but the dispersion was still difficult due to the formation of aggregates within the polymeric matrix, effectively eliminating the dimensional advantage compared to microcrystalline zinc oxide.

On the other hand, the use of compounds consisting of zinc oxide nanoparticles directly linked to silica nanoparticles, compounds having the dual function of filler and vulcanisation activators (hereinafter referred to generically as activating fillers or specifically as $ZnO/SiO_2$) has proved advantageous (see the articles A. Susanna et al. *ZnO nanoparticles anchored to silica filler. A curing accelerator for isoprene rubber composites*, Chemical Engineering Journal 275 (2015) 245-252) and A. Susanna et al., *Catalytic effect of ZnO anchored silica nanoparticles on rubber vulcanisation and cross-link formation*, European Polymer Journal 93 (2017) 63-74).

SUMMARY OF THE INVENTION

The Applicant has undertaken studies to further improve the effectiveness of the activating fillers described above in the production of compounds for tyres, with the aim of further reducing the amount thereof used for vulcanisation and, therefore, contain environmental pollution from zinc release, and at the same time maintaining or possibly improving process conditions, yields and above all the properties of the final elastomeric compounds.

Surprisingly, the Applicant has found that zinc in ionic form can be bound to particles of a white filler, for example silica nanoparticles, through a coupling agent comprising reactive groups capable of binding to the surface of the white filler, in particular capable of forming oxygen bridges, and coordinating groups capable of chelating zinc in ionic form.

The coupling agent can therefore be schematised by the following formula (I):

wherein GR represents one or more reactive groups capable of binding to the surface of the white filler through the formation of oxygen bridges (—O—), ROS represents an organo-silane residue, and GC represents one or more coordinating groups.

Moreover, the material produced by the Applicant can therefore be schematised by the following formula (II),

wherein the reactive groups GR reacted with the surface of the white filler (CB) to form oxygen bridges (—O—) with the organo-silane residue (ROS), and subsequently the coordinating groups GC chelated the zinc in ionic form (Zn).

The Applicant has surprisingly found that such materials offer various advantages when used in the vulcanisation processes of the compounds used in the production of tires.

Advantageously, the use of such materials makes zinc in ionic form readily available, thus more rapidly and more efficiently forming the organo-metal complexes with the accelerant and sulphur molecules, which therefore act as more efficient sulphuring agents.

In particular, the greater availability and efficiency of these materials allows lower amounts of zinc to be used than the amounts used with conventional zinc-based materials and allows the use of fatty acids, such as for example stearic acid, to be avoided altogether.

The Applicant has observed that the use of such materials allows using lower mixing temperatures because they do not require the use of silanes, to the full advantage of the integrity of the materials and the preparation costs of the elastomeric compound to be subjected to vulcanisation.

Moreover, the Applicant has observed that such materials allow faster vulcanisation times as well as better mechanical properties of the resulting vulcanised materials.

A further advantage observed by the Applicant consists in reducing or completely eliminating the phenomena of release of the zinc from the tire during use, since the zinc remains bonded to the surface of the white filler without having the possibility of migrating towards the surface of the tyre, with obvious advantages from the environmental point of view.

A first aspect of the present invention is therefore a compound represented by the following formula (II):

$$\text{CB-O-ROS-GC-Zn} \tag{II}$$

wherein CB represents the white filler, O represents one or more oxygen bridge bonds, ROS represents an organo-silane residue, GC represents one or more coordinating groups forming a chelate with zinc in ionic form, and Zn represents zinc in ionic form coordinated with the coordinating groups, wherein said coordinating groups GC are linear, branched or cyclic alkyl chains, comprising one or more heteroatoms inside or at the end of the alkyl chain.

A second aspect of the present invention is represented by a process for the preparation of the compound according to the first aspect of the present invention, wherein said process comprises at least:
providing a white filler (CB)
providing a coupling agent having the following formula (I):

$$\text{GR-ROS-GC} \tag{I}$$

wherein GR represents one or more reactive groups capable of forming oxygen bridges with the surface of said white filler, ROS represents an organo-silane residue, and GC represents one or more coordinating groups,
providing a zinc compound ($Zn^{2+}$)
reacting the white filler (CB) with one or more reactive groups (GR) of said compound of formula (I) so as to form oxygen bridges (—O—) between said white filler and said organo-silane residue (ROS), and
reacting one or more coordinating groups (GC) of said compound of formula (I) with the zinc compound so as to form a chelate, and
separating the resulting compound of formula (II) CB-O-ROS-GC-Zn.

A third aspect of the present invention is represented by a process for the preparation of a vulcanisable elastomeric compound for tyres, where said process comprises at least:
a mixing step (1) of at least one elastomeric polymer and of at least one additive for elastomeric compounds, with the exception of a vulcanising agent, to give a non-vulcanisable elastomeric compound;
a mixing step (2) of the non-vulcanisable elastomeric compound and of at least one vulcanising agent, to give a vulcanisable elastomeric compound, and
a step of unloading of the vulcanisable elastomeric compound, wherein a compound according to the first aspect of the invention is added in at least one of said mixing steps (1) and (2).

A fourth aspect of the present invention is represented by a vulcanisable elastomeric compound obtained according to the process of the third aspect of the present invention.

A fifth aspect of the present invention is a component of a tyre comprising the vulcanisable compound of the fourth aspect of the invention or the vulcanised compound obtained by vulcanisation thereof.

A sixth aspect of the present invention is a tyre for vehicle wheels comprising a component according to the fifth aspect of the invention.

Definitions

For the purposes of the present description and of the following claims, the term "phr" (parts per hundreds of rubber) means the parts by weight of a given component of the elastomeric composition by 100 parts by weight of the diene elastomeric polymer.

Unless otherwise indicated, all the percentages are expressed as percentages by weight.

In the present description, the term "elastomeric polymer" or "rubber" or "elastomer" means a natural or synthetic polymer which, after vulcanisation, at room temperature can be stretched repeatedly to at least twice its original length and which, after removal of the tensile load substantially immediately returns with force to approximately its original length (according to the definitions of the ASTM D1566-11 Standard terminology relating to Rubber).

In the present description, the term "reinforcing filler" refers to a reinforcing material typically used in the sector to improve the mechanical properties of tyre rubbers, preferably selected from among carbon black, conventional silica, such as silica from sand precipitated with strong acids, preferably amorphous, diatomaceous earth, calcium carbonate, titanium dioxide, talc, alumina, aluminosilicates, kaolin, silicate fibres and mixtures thereof.

In the present description, the term "white filler" refers to a conventional reinforcing material used in the sector selected from among conventional silica and silicates, such as sepiolite, paligorskite also known as attapulgite, montmorillonite, alloisite and the like, possibly modified by acid treatment and/or derivatised. Typically, white fillers have surface hydroxyl groups.

In the present description, the term "reactive group" indicates a group capable of reacting with the surface hydroxyl groups of the white filler and form an oxygen bridge (—O—) with elimination of water or alcohol, typically a hydroxyl group (—OH) or an alkoxy group (—OR) where R represents a linear or branched alkyl chain having 1 to 6 carbon atoms.

In the present description, the term "organo-silane residue" means a residue comprising at least one linear or branched alkyl chain having 1 to 6 carbon atoms bonded to a silicon atom.

In the present description, the term "coordinating group" indicates a functional group comprising an atom capable of forming a coordination bond with the zinc ion ($Zn^{2+}$), such as for example nitrogen, oxygen or sulphur.

In the present description, the term "zinc compound" means a compound selected from ZnO, $Zn(OH)_2$, and the organic or inorganic salts of $Zn^{2+}$. In the present description, the term "elastomeric compound" refers to the product obtained by mixing and, optionally, heating at least one elastomeric polymer with at least one of the additives commonly used in the preparation of tyre compounds.

In the present description, the term "non-vulcanisable elastomeric compound" means the product obtained by mixing at least one elastomeric polymer with at least one of the additives commonly used in the preparation of tire compounds, with the exception of vulcanising agents. A non-vulcanisable elastomeric compound can also be referred to as a phase elastomeric compound (1).

In the present description, the term "vulcanisable elastomeric compound" means an elastomeric compound ready for vulcanisation, in which all the additives including those of vulcanisation have been incorporated. A vulcanisable elastomeric compound can also be referred to as a phase elastomeric compound (2).

In the present description, the term "vulcanised elastomeric compound" means the material obtained by vulcanisation of a vulcanisable elastomeric compound.

In the present description, the term "mixing step (1)" indicates the step of the production process of the elastomeric compound in which one or more additives can be incorporated by mixing and possibly heating, except those of vulcanisation which are fed in step (2).

In the present description, the term "mixing step (2)" indicates the subsequent step of the production process of the elastomeric compound in which the vulcanisers and, preferably, the vulcanisation accelerants and/or retardants are introduced and mixed in the material, at a controlled temperature, generally at a mixing temperature lower than 160° C.

The mixing step (1) is also referred to as the "non-productive step" since the components of the compound are fed to the mixing device, except those of cross-linking (for example, sulphur and accelerants).

The mixing step (2) is instead referred to as the production step. In this step, the elastomeric compound obtained from step (1) and the vulcanisation additives capable of favouring and/or controlling cross-linking are fed to the mixing device, so as to provide the vulcanisable elastomeric compound.

In the present description, the term "green" is generally used to indicate a material, a compound, a composition, a component or a tyre not yet vulcanised.

DETAILED DESCRIPTION OF THE INVENTION

The process for the preparation of the compound of formula (II) according to the invention will be illustrated in detail below.

This process is characterised by one or more of the following preferred aspects taken alone or in combination with one another, in particular by the use of a coupling agent having the following formula (I):

GR-ROS-GC   (I)

wherein GR represents one or more reactive groups, ROS represents an organo-silane residue, and GC represents one or more coordinating groups.

The process of the present invention comprises at least:
providing a white filler (CB)
providing a coupling agent having the following formula (I):

GR-ROS-GC   (I)

wherein GR represents one or more reactive groups, ROS represents an organo-silane residue, and GC represents one or more coordinating groups,
providing a zinc compound ($Zn^{2+}$)
reacting the white filler (CB) with one or more reactive groups (GR) of said compound of formula (I) so as to form oxygen bridges between said white filler and said reactive groups (GR), and
reacting one or more coordinating groups (GC) of said compound of formula (I) with the zinc compound so as to form a chelate, and
separating the resulting compound of formula (II) CB-O-ROS-GC-Zn.

The white filler may be any conventional white reinforcing filler that has hydroxyl groups on the surface.

The white filler is preferably selected from conventional silica and silicates, in the form of fibres, flakes or granules, such as bentonite, nontronite, beidellite, volkonskoite, hectorite, saponite, sauconite, vermiculite, sericite, sepiolite, paligorskite also known as attapulgite, montmorillonite, alloisite and the like, possibly modified by acid treatment and/or derivatised, and mixtures thereof, more preferably it is silica.

Silica may vary in shape, specific surface area and size.

Examples of silica are a pyrogenic silica, a precipitated amorphous silica, a wet silica (hydrated silicic acid), or mixtures thereof.

Examples of suitable commercial silicas are the precipitated silica Rhodia Zeosil MP1165 (BET specific surface area 160 $m^2$/g), Ultrasil VN3 GR (BET specific surface area 180 $m^2$/g) and Zeosil 1115 MP (BET specific surface area 95-120 $m^2$/g).

Preferably, the silica has a specific surface area (BET) of at least 120 $m^2$/g, more preferably of at least 140 $m^2$/g.

Preferably, the silica has a specific surface area (BET) smaller than 220 $m^2$/g, more preferably smaller than or equal to 180 $m^2$/g.

Useful examples of compounds represented by the formula (I) are alkoxy silanes functionalised with one or more functional groups comprising a heteroatom, where the alkoxy groups represent the reactive groups GR capable of binding with the white filler, and the functional groups comprising a heteroatom represent the coordinating groups GC capable of forming a coordination bond with the zinc ion.

Preferred examples of reactive groups GR are alkoxy groups having 1 to 4 carbon atoms, namely the methoxy, ethoxy, propoxy, isopropoxy, butoxy, isobutoxy, and tert-butoxy groups.

Preferred examples of coordinating groups GC are functional groups represented by the formula —$C_nH_{2n}$—$XC_mH_{2m}$—Y, where n and m, equal or different from each other, are an integer from 1 a 6 inclusive; Y and X, equal or different from each other, are a group selected from mercapto and amino.

Useful examples of compounds represented by the formula (I) are represented by the following general formula (Ia):

$(R)_3Si$—$C_nH_{2n}$—X—$C_mH_{2m}$—Y   (Ia)

wherein the R groups, equal to or different from each other, are selected from alkyl or alkoxy groups having 1 to 4 carbon atoms, provided that at least one of the R groups is an alkoxy group; n and m, equal or different from each other, are an integer from 1 to 6 inclusive; Y and X, equal or different from each other, are a group selected from mercapto and amino.

Compounds usable in the present invention represented by the formula (Ia) are (3-aminopropyl)triethoxysilane (APTES), N-(2-aminoethyl)-3-aminopropyl-trimethoxysilane (also known as N-[3-(trimethoxysilyl)propyl]ethylenediamine (EDTMS)), N-(2-aminoethyl)-3-aminopropyl-triethoxysilane, N-(2-aminoethyl)-3-aminopropyl-methyl-dimethoxysilane, 3-aminopropylmethyl-diethoxysilane, 3-ureidopropyl-trimethoxy silane, 3-ureidopropyl-triethoxysilane, N-cyclohexyl(aminomethyl) methyldiethoxy silane, N-cyclohexyl(aminomethyl) triethoxysilane, N-cyclohexyl-3-aminopropyl-trimethoxysilane, 3-(2-aminomethylamino) propyl-triethoxysilane, N-(n-butyl)-3-aminopropyltrimethoxy-silane, N-(2-aminoethyl)-3-aminopropylmethyldiethoxysilane, N-(2-aminoethyl)-3-aminoisobutyl-methyldimethoxysilane, 3-aminopropylmethyldimethoxysilane, 3-(2-(2-aminoethylamino)ethylamino)propyl-trimethoxysilane, N-(n-butyl)-3-aminopropyl-triethoxysilane, N,N-diethylaminopropyltrimethoxysilane, N,N-dimethylaminopropyl-trimethoxysilane, butylaminemethyl-triethoxysilane, N-cyclohexyl(aminomethyl) trimethoxy-silane, 2-aminoethylaminomethyl-triethoxysilane, diethylaminomethyl-triethoxysilane, (3-mercaptopropyl)triethoxysilane and (3-mercaptopropyl)trimethoxysilane. Preferred compounds represented by the formula (Ia) are (3-mercaptopropyl) trimethoxysilane, (3-aminopropyl)triethoxysilane (APTES), (3-aminopropyl)trimethoxysilane, N-(2-aminoethyl)-3-aminopropyltrimethoxysilane (also known as N-[3-(trimethoxysilyl)propyl]ethylenediamine (EDTMS)), and N-(2-aminoethyl)-3-aminopropyltriethoxysilane.

The zinc compound may be ZnO, $Zn(OH)_2$, and the organic or inorganic salts of $Zn^{2+}$, such as zinc nitrate, zinc sulphate, zinc chloride, zinc bromide and zinc acetate.

The reaction step between the white filler and the coupling agent is carried out hot in the solvent phase, by first dispersing the white filler in a suitable solvent and then adding the coupling agent, allowing it to react until the reaction is completed.

The solvent used for the reaction is preferably selected from the group of non-polar solvents, such as hexane, cyclohexane, benzene and toluene.

Optionally, the white filler is first activated by dispersion in a basic aqueous solution, such as for example a sodium hydroxide solution. The activation of the white filler is carried out at room temperature, ranging from 20° to 30° C., for a period of at least 1 hour, more preferably at least 3 hours, and even more preferably at least 6 hours. The activation period is preferably less than 48 hours, more preferably less than 36 hours. Advantageously, the activation period is in the range between 12 and 24 hours. The white filler thus activated is separated by conventional separation techniques (filtration, centrifugation, and so on) and then subjected to lyophilisation. The reaction between the white filler and the coupling agent is preferably carried out at a temperature higher than 40° C., more preferably higher than 60° C., and even more preferably higher than 80° C. The reaction temperature is preferably lower than 200° C., more preferably lower than 180° C., and even more preferably lower than 160° C.

The reaction between the white filler and the coupling agent is preferably carried out at the reflux temperature of the reaction mixture for a period of at least 1 hour, more preferably at least 3 hours, and even more preferably at least 6 hours. The reaction period is preferably less than 48 hours, more preferably less than 36 hours. Advantageously, the reaction period is in the range between 12 and 24 hours.

The reaction product represented by the functionalised white filler is separated by conventional separation techniques (filtration, centrifugation, and so on) and then dried at temperatures between 60° C. and 100° C.

The functionalised white filler, which can be represented with the formula CB-O-ROS-GC, is then reacted with the zinc compound to form the chelate represented by the formula (II).

The reaction is carried out hot in the solvent phase, by first dispersing the functionalised white filler (CB-O-ROS-GC) in a suitable solvent and then adding the zinc compound, allowing it to react until the reaction is completed.

The solvent used for the reaction is preferably selected from the group of polar protic solvents, such as ethanol, methanol and isopropanol.

The reaction is preferably carried out at a temperature higher than 40° C., more preferably higher than 60° C., and even more preferably higher than 80° C. The reaction temperature is preferably lower than 200° C., more preferably lower than 180° C., and even more preferably lower than 160° C.

The reaction is preferably carried out at the reflux temperature of the reaction mixture for a period of at least 10 minutes, more preferably at least 30 minutes, and even more preferably at least 1 hour. The reaction period is preferably less than 12 hours, more preferably less than 6 hours. Advantageously, the reaction period is in the range between 2 and 4 hours.

The reaction product represented by the formula (II) according to the present invention is separated by conventional separation techniques (filtration, centrifugation, and so on) and then dried at temperatures between 60° C. and 100° C.

The process for preparing a vulcanisable elastomeric compound for tyres according to the invention will be illustrated in detail below.

This process is characterised by one or more of the following preferred aspects taken alone or in combination with one another, in particular by the use of a compound represented by the following formula (II):

$$\text{CB-O-ROS-GC-Zn} \qquad (II)$$

wherein CB represents the white filler, O represents one or more oxygen bridge bonds, ROS represents an organosilane residue, GC represents one or more coordinating groups forming a chelate with zinc in ionic form, and Zn represents zinc in ionic form coordinated with the coordinating groups, wherein said coordinating groups GC are linear, branched or cyclic alkyl chains, comprising one or more heteroatoms inside or at the end of the alkyl chain.

The present process can be a continuous process but, preferably, it is a discontinuous process (batch).

The present process, when discontinuous, can be carried out in one or more mixers, preferably in a single mixer.

The process according to the invention comprises a mixing step (step 1) of at least one diene elastomeric polymer and at least one additive for elastomeric compounds, which is not a vulcanising agent.

The at least one additive for elastomeric compounds which is mixed together with the at least one diene elastomeric polymer in the mixing step (1) can be for example the compound of formula (II) of the present invention, a reinforcing filler, an antioxidant, a wax, a plasticiser and the like.

Generally in the mixing step (1) no vulcanising agent is added and, preferably, not even vulcanisation accelerant agents or retardant agents.

In the present process, in the mixing step (1) the compound of formula (II) of the present invention can be fed, in whole or in part.

Preferably, the compound of formula (II) of the present invention is all fed in step (1).

In step (1), mixing is carried out at mixing temperatures generally between 70° and 160° C. and for times typically between 2 and 20 minutes.

Before proceeding with step (2), it may be advantageous to carry out a step of discharge and/or rest of the non-vulcanisable elastomeric compound in order to allow the completion of any reactions.

Preferably, the compound of step (1) is discharged before proceeding with step (2). In the subsequent step (2), at least one vulcanising agent is incorporated. Possibly, in step (2) at least one vulcanisation accelerant agent, at least one vulcanisation retardant agent, and if not already completely fed into the mixing step (1), the compound of formula (II) of the present invention can be added.

In step (2) of the present process, the mixing temperature is generally kept below 160° C., preferably at 140° C., more preferably at 120° C., so as to avoid any undesired pre-cross-linking phenomenon.

Generally in step (2) the mixing can be carried out at mixing temperatures between 70° and 155° C. and for times between 2 and 10 minutes.

At the end of step (2), the present process involves a step of unloading the vulcanisable elastomeric compound which will be destined to the subsequent typical processing steps for the production of tyres and components thereof.

In one or more of the steps of the present process, other additives commonly used in the production of tyre compounds can be added, selected on the basis of the specific application for which the composition is intended. For example, the following may be added: anti-ageing agents, plasticisers, adhesives, anti-ozone agents, modifying resins, or mixtures thereof.

In the present process, the at least one diene elastomeric polymer can be selected from those commonly used in sulphur-vulcanisable elastomeric compositions, which are particularly suitable for producing tyres, i.e. from among elastomeric polymers or copolymers with an unsaturated chain having a glass transition temperature (Tg) generally lower than 20° C., preferably in the range from 0° C. to −110° C.

Preferably, the diene elastomeric polymer has a weight average molecular weight (Mw) higher than 80000 g/mol.

These polymers or copolymers may be of natural origin or may be obtained by solution polymerization, emulsion polymerization or gas-phase polymerization of one or more conjugated diolefins, optionally mixed with at least one comonomer selected from monovinylarenes and/or polar comonomers in an amount not exceeding 60% by weight.

The conjugated diolefins generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof. 1,3-butadiene and isoprene are particularly preferred.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile and mixtures thereof.

Preferably, the diene elastomeric polymer which can be used in the present invention can be selected, for example, from: cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

The above vulcanisable elastomeric compound may possibly comprise an elastomeric polymer of one or more monoolefins with an olefinic comonomer or derivatives thereof. The monoolefins can be selected from: ethylene and α-olefins generally containing from 3 to 12 carbon atoms, such as for example propylene, 1-butene, 1-pentene, 1-hexene, 1-octene and mixtures thereof. The following are preferred: copolymers selected from ethylene and an α-olefin, optionally with a diene; isobutene homopolymers or copolymers thereof with small amounts of a diene, which are optionally at least partially halogenated. The diene possibly present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene and mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; or mixtures thereof.

A diene elastomeric polymer or an elastomeric polymer functionalised by reaction with suitable terminating agents or coupling agents may also be used. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, imines, carbodiimides, alkyltin halides, substituted benzophenones, alkoxysilanes or aryloxysilanes.

In the present process for the preparation of the vulcanisable elastomeric compound, the at least one elastomeric polymer may comprise one or more diene elastomeric polymers as defined above in mixture which can be advantageously subjected to the chewing step (step 1-0) to be better blended.

In the present process, the quantity used of the at least one elastomeric polymer or the mixture of two or more elastomeric polymers as defined above amounts to a total of 100 phr.

In the present process, the at least one vulcanisation agent is preferably selected from sulphur, or alternatively, sulphur-containing molecules (sulphur donors), such as for example caprolactam disulphide (CLD), bis (trialcoxysilyl)propyl] polysulphides, dithiophosphates, phosphorylpolysulphide (SDT) and mixtures thereof.

Preferably, the vulcanising agent is sulphur preferably selected from soluble sulphur (crystalline sulphur), insoluble sulphur (polymeric sulphur), (iii) oil-dispersed sulphur and mixtures thereof.

Commercial examples of suitable vulcanising agents are the 65% sulphur known under the trade name of Rhenogran of Lanxess, the 67% sulphur known under the trade name of Crystex OT33 of Eastman, the 95% sulphur known under the trade name of Solvay SchwefelKC, the rhombic crystalline sulphur known under the trade name of Sulphur (1% oil and 0.3% silica) of Zolfindustria.

The vulcanising agent may be present in the vulcanisable elastomeric compound in an overall amount generally of from 0.1 to 15 phr, preferably from 0.5 to 10 phr, even more preferably from 1 to 7 phr.

The present elastomeric compound may comprise one or more vulcanising agents as defined above in a mixture.

In the present process, the vulcanising agent is preferably used together with adjuvants such as vulcanisation accelerants and/or retardants known to those skilled in the art.

In the present process, the vulcanisation accelerant agent is preferably selected from dithiocarbamates, guanidines, thioureas, thiazoles, sulphenamides, sulphenimides, thiurams, amines, xanthates and mixtures thereof.

Preferably, the accelerant agent is selected from N-cyclohexyl-2-benzothiazol-sulphenamide (CBS), N-tert-butyl-2-benzothiazol-sulphenamide (TBBS) and mixtures thereof.

A commercial example of a suitable accelerant agent is N-cyclohexyl-2-benzothiazol-sulphenamide Vulkacit® (CBS or CZ) marketed by Lanxess.

The accelerant agent may be present in the vulcanisable elastomeric compound in an overall amount generally ranging between 0.05 phr and 10 phr, preferably between 0.1 phr and 5 phr.

The present elastomeric compound may comprise one or more accelerant agents as defined above in a mixture.

In the present process, the vulcanisation retardant agent may be selected for example from urea, phthalic anhydride, N-nitrosodiphenylamine N-cyclohexylthiophthalimide (CTP or PVI), and mixtures thereof.

A commercial example of a suitable retardant agent is N-cyclohexylthiophthalimide VULKALENT G of Lanxess.

The retardant agent may be present in the vulcanisable elastomeric compound in an amount generally ranging between 0.05 phr and 2 phr.

The present elastomeric compound may comprise one or more retardant agents as defined above in a mixture.

Preferably in the present process, preferably in the mixing step (1), one or more optional additives may be fed such as for example at least one reinforcing filler, at least one antioxidant agent, at least one wax and at least one plasticiser.

In the present process, the reinforcing filler is selected from carbon black, conventional silica, such as sand silica precipitated with strong acids, preferably amorphous, hydrotalcite, diatomaceous earth, calcium carbonate, titanium dioxide, talc, alumina, aluminosilicates, kaolin, silicate fibres and mixtures thereof.

Preferably, the further reinforcing filler is selected from carbon black, conventional silica, silicate fibres and mixtures thereof, preferably it is silica.

Carbon black can be selected from those of standard grade for tyres, or having a surface area not smaller than 20 m$^2$/g, more preferably greater than 50 m$^2$/g (measured in accordance with the ASTM D6556-16 standard).

A commercial example of a suitable reinforcing filler is the Zeosil 1165MP silica from Solvay Rhodia.

Commercial examples of carbon black are N375 or N234 marketed by Birla Group (India) or Cabot Corporation.

The reinforcing filler may be present in the vulcanisable elastomeric compound in an amount generally ranging between 0 phr and 120 phr, preferably between 3 phr and 80 phr.

In one embodiment, the reinforcing filler may be absent, in which case the reinforcing function is performed by the compound of formula (II) according to the present invention.

For some applications, the elastomeric compound prepared according to the present process may comprise at least 1 phr, more preferably at least 2 phr, more preferably at least 3 or 4 phr of carbon black, which advantageously protects the elastomer from ageing caused by the action of ultraviolet radiation.

The present elastomeric compound may comprise one or more reinforcing fillers as defined above in a mixture.

In the present process, as antioxidant, phenylenediamine, diphenylamine, dihydroquinoline, phenol, benzimidazole, hydroquinone and derivatives thereof, possibly in a mixture, may be used.

In the present process, the antioxidant agent is preferably selected from N-isopropyl-N'-phenyl-α-phenylenediamine (IPPD), N-(1,3-dimethyl-butyl)-n'-phenyl-p-phenylenediamine (6PPD), N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-bis(1-methylheptyl)-p-phenylenediamine, N,N'-Di-sec-butyl-p-phenylenediamine (44PD), N-phenyl-N-cyclohexyl-p-phenylene diamine, N-phenyl-N'-1-methylheptyl-p-phenylenediamine and the like and mixtures thereof, preferably it is N-(1,3-dimethyl-butyl)-N'-phenyl-p-phenylenediamine (6PPD).

A commercial example of a suitable antioxidant agent is 6PPD of Solutia/Eastman. The antioxidant agent may be present in the vulcanisable elastomeric compound in an overall amount generally ranging between 0 phr and 20 phr, preferably between 0.5 phr and 10 phr.

In the present process, the wax may be for example a petroleum wax or a mixture of paraffins.

Commercial examples of suitable waxes are the Repsol N-paraffin mixture and the Antilux® 654 microcrystalline wax from Rhein Chemie.

The wax may be present in the vulcanisable elastomeric compound in an overall amount generally ranging between 0 phr and 20 phr, preferably between 0.5 phr and 5 phr.

In the present process, in order to further improve the processability, the elastomeric compound may be admixed with at least one plasticiser agent generally selected from mineral oils, vegetable oils, synthetic oils, polymers with a low molecular weight and mixtures thereof, such as, for example, aromatic oil, naphthenic oil, phthalates, soybean oil and mixtures thereof. The amount of plasticiser generally ranges from 0 phr and 70 phr, preferably from 5 phr to 30 phr. Preferably, the plasticising agent is added in the chewing step of the polymer 1-0, if present.

A fourth aspect of the present invention is represented by a vulcanisable elastomeric compound obtained according to the process of the third aspect of the present invention.

Preferably, the vulcanisable elastomeric compound according to the invention comprises zinc in an amount lower than 4 phr, more preferably lower than 3 phr, even more preferably lower than 2 phr with a consequent advantage for the environment of a lower release thereof compared to conventional elastomeric compounds.

Preferably, the vulcanised elastomeric compound according to the invention comprises zinc in an amount lower than 4 phr, more preferably lower than 3 phr, even more preferably lower than 2 phr.

In the elastomeric compound according to the invention the zinc is present in ionic form as $Zn^{2+}$, bound by coordination bonds to form the compound represented by the formula (II) of the present invention, but not in the form of metallic zinc ($Zn°$).

The amount of zinc in the compound can be determined for example by ICP-AES spectrometry, as described in the experimental part.

The present vulcanisable elastomeric compound can be incorporated in one or more components of the tyre.

Due to the presence of the at least one vulcanising agent, the vulcanisable compound may be vulcanised according to known techniques.

Due to the use of the compound represented by the formula (II) of the present invention as an activator, a complete and homogeneous dispersion of the zinc is obtained with undoubted advantages in the subsequent vulcanisation reaction of the elastomeric compound, such as a greater and more uniform cross-linking, the absence of unreacted zinc oxide aggregates, and in the properties of the vulcanised compound in terms of static and dynamic mechanical properties, as well as greater reactivity of the green compound. This particular reactivity is evidenced by the reduction of the crosslinking times and/or by obtaining a greater maximum torque (MH). The compound of the present invention also shows values of the static modules (Ca0.1 and Ca0.5) of the references, predictive of a good elasticity of the compound predictive of a good handling of the tyre. Finally, the compound of the present invention has high hysteresis at low temperatures (10° C. and 23° C.) which are predictive of good performance on wet and dry braking, without substantially affecting high speed performance.

Thanks to the present process, it is possible to reduce the quantity of zinc incorporated in the compounds, with important benefits for the environment, without deteriorating or even improving their performance compared to comparable conventional compounds.

According to a fifth aspect of the invention, the present elastomeric compound is applied to tyre components such as tread, underlayer, anti-abrasive elongated element, sidewall, sidewall insert, mini-sidewall, under-liner, rubber layers, bead filler and sheet, more preferably in the tread, in the under-layer and in the sidewall.

Preferably, the tyre component according to the invention consists of the vulcanisable compound according to the invention (green component) or of the vulcanised compound obtained by vulcanisation thereof (vulcanised component).

A sixth aspect of the present invention is a tyre for vehicle wheels comprising at least one of the components indicated above.

Preferably, the tyre for vehicle wheels of the invention comprises at least one tyre component which consists of a vulcanisable elastomeric compound (green component) according to the second aspect of the invention or of a vulcanised elastomeric compound obtained by vulcanisation thereof.

In one embodiment, a tyre for vehicles according to the present invention comprises at least
- a carcass structure comprising at least a carcass ply having opposite lateral edges associated to respective bead structure;
- possibly a pair of sidewalls applied to the lateral surfaces of the carcass structure, respectively, in an axially outer position;
- possibly a belt structure applied in radially outer position with respect to the carcass structure;
- a tread band applied in a radially outer position to said carcass structure or, if present, said belt structure,
- possibly a layer of elastomeric material, referred to as under-layer, applied in a radially inner position with respect to said tread band, wherein at least one component selected from said pair of sidewalls, said under-layer and said tread band comprises, or preferably consists of, the elastomeric compound according to the invention.

An embodiment according to the present invention relates to a tyre for high performance vehicles (HP, SUV and UHP), wherein at least one component, preferably selected from under-layer, sidewall and tread band, comprises, or preferably consists of, the elastomeric compound according to the invention.

An embodiment according to the present invention relates to a tyre for heavy vehicles in which at least one component, preferably selected from under-layer, sidewall and tread band, comprises, or preferably consists of, the elastomeric compound according to the invention.

The tyre according to the invention may be a tyre for two, three or four-wheeled vehicles.

In one embodiment, the tyre according to the invention is a tyre for bicycle wheels. A tyre for bicycle wheels typically comprises a carcass structure turned around a pair of bead cores at the beads and a tread band arranged in a radially outer position with respect to the carcass structure.

The carcass structure is intended to withstand the inflation pressure and to support the weight of the bicycle and the cyclist. It comprises one or more carcass plies, each comprising a plurality of suitably oriented reinforcing cords. In the case of several carcass plies, they are inclined with respect to each other to form a crossed structure.

The bead cores have the task of ensuring that the tyre is anchored to the wheel rim.

In the radially inner position of the carcass structure, an air chamber may be provided in which pressurised air is introduced.

The tyre according to the invention can be for summer or winter use or for all seasons.

The tyre according to the present invention can be manufactured according to a process which comprises:
- building components of a green tyre on at least one forming drum;
- shaping, moulding and vulcanising the tyre;
- wherein building at least one of the components of a green tyre comprises:
- manufacturing at least one green component comprising, or preferably consisting of, the vulcanisable elastomeric compound of the invention.

DESCRIPTION OF THE DRAWINGS

In particular, FIG. 1 shows a radial half-section of a tyre for vehicle wheels, comprising a vulcanised elastomeric compound prepared by vulcanisation of an elastomeric compound prepared according to the process of the invention.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

Figure 1:
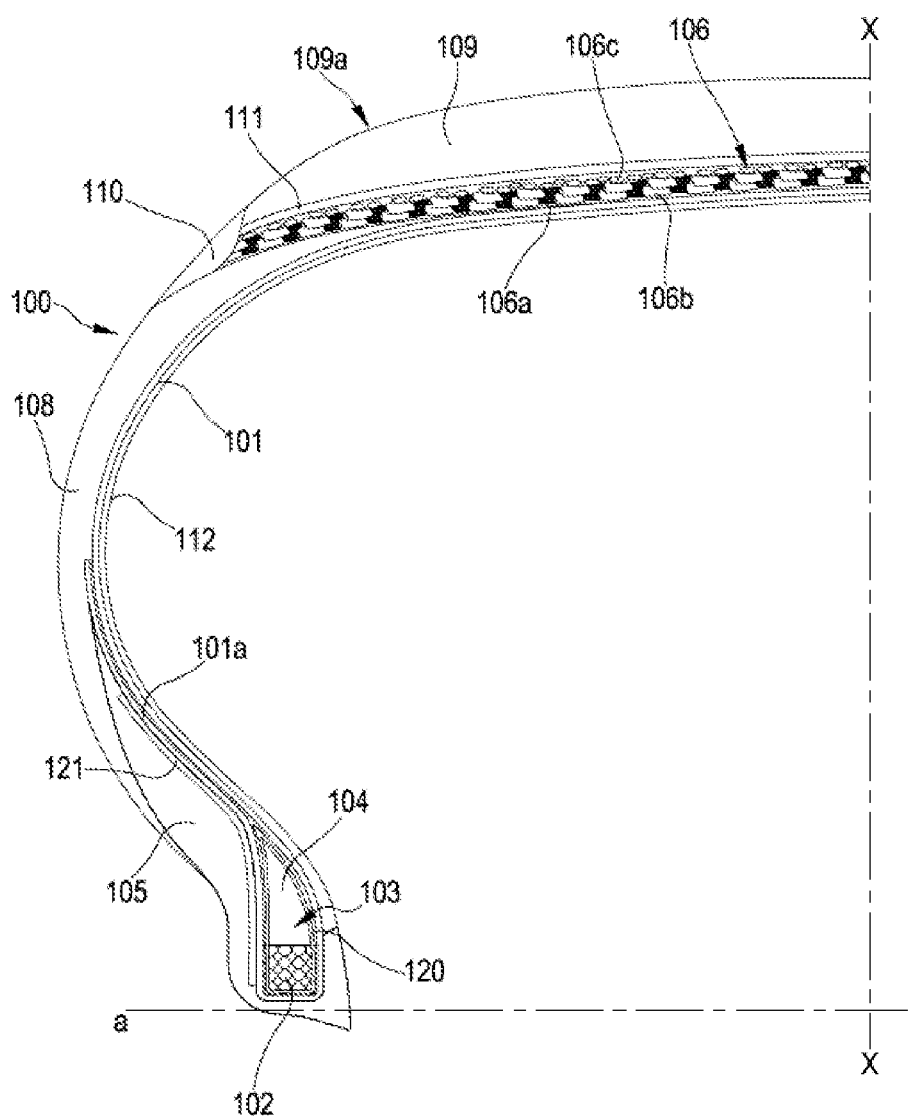
FIG. 1 shows a radial half-section of a tyre for vehicle wheels according to the invention.

Tyre 100 for four-wheeled vehicles comprises at least one carcass structure, comprising at least one carcass layer 101 having respectively opposite end flaps engaged with respective annular anchoring structures 102, referred to as bead cores, possibly associated to a bead filler 104.

The carcass layer 101 is optionally made with an elastomeric compound.

The tyre area comprising the bead core 102 and the filler 104 forms a bead structure 103 intended for anchoring the tyre onto a corresponding mounting rim, not shown.

The carcass structure is usually of radial type, i.e. the reinforcing elements of the at least one carcass layer 101 lie on planes comprising the rotational axis of the tyre and substantially perpendicular to the equatorial plane of the tyre. Said reinforcement elements generally consist of textile cords, such as rayon, nylon, polyester (for example polyethylene naphthalate, PEN). Each bead structure is associated to the carcass structure by folding back of the opposite lateral edges of the at least one carcass layer 101 around the annular anchoring structure 102 so as to form the so-called carcass flaps 101a as shown in FIG. 1.

In one embodiment, the coupling between the carcass structure and the bead structure can be provided by a second carcass layer (not shown in FIG. 1) applied in an axially outer position with respect to the first carcass layer.

An anti-abrasive strip 105 optionally made with an elastomeric compound is arranged in an outer position of each bead structure 103.

The carcass structure is associated to a belt structure 106 comprising one or more belt layers 106a, 106b placed in radial superposition with respect to one another and with respect to the carcass layer, having typically textile and/or metallic reinforcement cords incorporated within a layer of vulcanised elastomeric compound.

Such reinforcement cords may have crossed orientation with respect to a direction of circumferential development of tyre 100. By "circumferential" direction it is meant a direction generally facing in the direction of rotation of the tyre.

At least one zero-degree reinforcement layer 106c, commonly known as a "0° belt", may be applied in a radially outermost position to the belt layers 106a, 106b, which generally incorporates a plurality of elongated reinforcement elements, typically metallic or textile cords, oriented in a substantially circumferential direction, thus forming an angle of a few degrees (such as an angle of between about 0° and 6°) with respect to a direction parallel to the equatorial plane of the tyre, and coated with vulcanised elastomeric compound.

A tread band 109 of vulcanised elastomeric compound is applied in a position radially outer to the belt structure 106.

Moreover, respective sidewalls 108 of vulcanised elastomeric compound are applied in an axially outer position on the lateral surfaces of the carcass structure, each extending from one of the lateral edges of tread 109 at the respective bead structure 103.

In a radially outer position, the tread band 109 has a rolling surface 109a intended to come in contact with the ground. Circumferential grooves, which are connected by transverse notches (not shown in FIG. 1) so as to define a plurality of blocks of various shapes and sizes distributed over the rolling surface 109a, are generally made on this surface 109a, which for simplicity is represented smooth in FIG. 1.

An under-layer 111 of vulcanised elastomeric compound can be arranged between the belt structure 106 and the tread band 109.

A strip consisting of elastomeric compound 110, commonly known as "mini-sidewall", of vulcanised elastomeric compound can optionally be provided in the connecting zone between sidewalls 108 and the tread band 109, this mini-sidewall generally being obtained by co-extrusion with the tread band 109 and allowing an improvement of the mechanical interaction between the tread band 109 and sidewalls 108. Preferably, the end portion of sidewall 108 directly covers the lateral edge of the tread band 109.

In the case of tubeless tyres, a rubber layer 112, generally known as "liner", which provides the necessary impermeability to the inflation air of the tyre, can also be provided in a radially inner position with respect to the carcass layer 101.

The rigidity of the tyre sidewall 108 can be improved by providing the bead structure 103 with a reinforcing layer 120 generally known as "flipper" or additional strip-like insert.

Flipper 120 is a reinforcing layer which is wound around the respective bead core 102 and the bead filler 104 so as to at least partially surround them, said reinforcing layer being arranged between the at least one carcass layer 101 and the bead structure 103. Usually, the flipper is in contact with said at least one carcass layer 101 and said bead structure 103.

Flipper 120 typically comprises a plurality of textile cords incorporated within a layer of vulcanised elastomeric compound.

The bead structure 103 of the tyre may comprise a further protective layer which is generally known by the term of "chafer" 121 or protective strip and which has the function of increasing the rigidity and integrity of the bead structure 103.

Chafer 121 usually comprises a plurality of cords incorporated within a rubber layer of vulcanised elastomeric compound. Such cords are generally made of textile materials (such as aramide or rayon) or metal materials (such as steel cords).

A layer or sheet of elastomeric compound can be arranged between the belt structure and the carcass structure. The layer can have a uniform thickness.

Alternatively, the layer may have a variable thickness in the axial direction. For example, the layer may have a greater thickness close to its axially outer edges with respect to the central (crown) zone.

Advantageously, the layer or sheet can extend on a surface substantially corresponding to the extension surface of said belt structure.

In a preferred embodiment, a layer or sheet of elastomeric compound as described above can be placed between said belt structure and said tread band, said additional layer or sheet extending preferably on a surface substantially corresponding to the extension surface of said belt structure.

The elastomeric compound according to the present invention can be advantageously incorporated in one or more of the components of the tyre selected from the belt structure, carcass structure, tread band, under-layer, sidewall, mini-sidewall, sidewall insert, bead, flipper, chafer, sheet and anti-abrasive strip, preferably incorporated at least in the sidewalls and/or in the under-layer.

According to an embodiment not shown, the tyre may be a tyre for motorcycle wheels which is typically a tyre that has a straight section featuring a high tread camber.

According to an embodiment not shown, the tyre may be a tyre for bicycle wheels.

According to an embodiment not shown, the tyre may be a tyre for heavy transport vehicle wheels, such as trucks, buses, trailers, vans, and in general for vehicles in which the tyre is subjected to a high load. Preferably, such a tyre is adapted to be mounted on wheel rims having a diameter equal to or greater than 17.5 inches for directional or trailer wheels.

The description of some preparative examples according to the invention and comparative examples, given only for illustrative and non-limiting of the scope if the invention, is set out below.

EXPERIMENTAL PART

Analysis Methods
White Filler Functionalisation

The functionalisation of the white filler was verified with solid-state ATR-FTIR, TGA, CHNS, BET and NMR analysis.

The ATR-FTIR analysis was performed with a Perkin Elmer Spectrum 100 instrument (spectra with a resolution of 4 cm$^{-1}$, region from 650 to 400 cm$^{-1}$, 32 scans).

Thermoqravimetric analysis (TGA) was performed with a TGA/DCS1 STARe SYSTEM (Mettler Toledo) instrument with constant air flow (50 mL min$^{-1}$). The method used involves applying a heating ramp of 10° C. min$^{-1}$, starting from an initial temperature of 30° C., up to a final temperature of 1000° C. Two 15-minute isotherms were also added at 150° C. and 1000° C. Measurements were carried out in alumina crucibles of 75 μL by volume.

The CHNS analysis was performed with an Elementar VarioMICRO analyzer in CHNS configuration. The uncertainty of the measure is declared at 0.1%. The measurements were normalised to a sulphanilamide standard. The combustion column is at a temperature of 1150° C., while the reduction column is at 850° C. The BET analysis was performed with the Micromeritics Tristar II porosity and surface area analysis equipment.

The solid state NMR analysis was performed with a 400WB Bruker spectrometer operating at the proton frequency of 400.13 MHz. The Magic Angle Spinning (MAS) NMR spectra were acquired with single-pulse (SP) and cross-polarized (CP) experiments. The following experimental conditions were applied for frequency acquisitions $^{29}$Si: 79.48 MHz, π/4 pulse 2 μs, decoupling length of 6.3 μs, recycling delay: 150 s, 3 k scans; for CP measurements: contact time 5 ms, πr/2 pulse 4 μs 2 k scans. For $^{13}$C frequency measurements: 100.52 MHz, CP, π/2 pulse, 2 ms contact time, 6.3 μs decoupling length, 4 s recycle delay, 2 k scans. $^1$H: single pulse seq. π/2 pulse 5 μs, recycle delay: 20 s, 32 scans. The samples were placed in 4 mm zirconia rotors, rotated at 7 kHz (10 kHz for proton) under air flow.

Determination of the Zinc Content

The zinc content can be measured by ICP-AES spectrometry (Inductively Coupled Plasma-Atomic Emission Spectroscopy) with ICP simultaneous plasma spectrometer (TJA IRIS II model; excitation source: radiofrequency generator with 27.12 MHz frequency and variable output power up to 1750 W).

XPS analysis was performed with a Perkin Elmer CD 5600-ci spectrometer instrument using a non-monochromatic dual-anode Al—Mg source. The samples were introduced into steel sample holders and introduced directly into a closed high-energy system in the analytical chamber of the instrument. The analysis area was 800 μm in diameter and the working pressure was less than 10$^{-9}$ mbar.

UV-Vis spectroscopic analysis was performed with a UV Lambda 900 Perkin Elmer spectrometer on powder samples, in the wavelength range between 800 and 200 nm, with an accuracy of 0.08 nm.

MDR rheometric analysis (according to ISO 6502): a rheometer Alpha Technologies type MDR2000 was used. The tests were carried out at 151° C. for 30 minutes or at 170° C. for 10 minutes, at an oscillation frequency of 1.66 Hz (100 oscillations per minute) and an oscillation amplitude of ±0.5°, measuring the minimum torque value (ML), maximum torque (MH), the time required to increase the torque by one or two units (TS1 and TS2), and the time necessary to reach different percentages (5, 30, 50, 60, 90, 95 and 100%) of the maximum torque value (MH).

Properties of Vulcanised Materials

The elastomeric materials prepared in the previous examples were vulcanised to give specimens on which analytical characterisations and the assessment of dynamic mechanical properties were conducted. Unless otherwise indicated, vulcanisation was carried out in a mould, in hydraulic press at 170° C. and at a pressure of 200 bar for about 10 minutes.

Static modules: static mechanical properties were measured at 23° C. according to the ISO 37:2005 standard. In particular, the tensile modules at various elongation levels (10%, 50%, 100% and 300%, named in the order CA0.1, CA0.5, CA1 and CA3) were measured on samples of vulcanised elastomeric compositions.

Dynamic modules: dynamic mechanical properties were measured using an Instron dynamic device in compression and tension operation with the following method. A sample of vulcanised elastomeric cylindrical compositions (length=25 mm; diameter=18 mm), preload in compression up to 25% of longitudinal deformation with respect to the initial length and maintained at the predetermined temperature (10° C., 23° C. or 100° C.) during the test was subjected to a dynamic sinusoidal tension with amplitude ±3.5% with respect to the length of the preload, at a frequency of 1 Hz, 10 Hz and 100 Hz.

The dynamic mechanical properties are expressed in terms of dynamic elastic modulus (E'), viscous dynamic modulus (E") and Tan delta (loss factor). The Tan delta value was calculated as the ratio between the viscous dynamic modulus (E") and the dynamic elastic modulus (E').

Example 1

Preparation of Functionalised Silica
Used Materials
Rhodia Zeosil MP1165 precipitated silica (specific surface area BET 160 m$^2$/g) produced by Rhodia
Coupling agent (APTES): 3-aminopropyl)triethoxysilane $H_2N(CH_2)_3Si\ (OC_2H_5)_3$ (99%) produced by Sigma Aldrich;
Zinc nitrate hexahydrate $Zn(NO_3)_2 \cdot 6H_2O$ (99%) produced by Alfa Aesar
Toluene (99%) produced by Alfa Aesar;
Anhydrous ethanol EtOH (99.9%) produced by Scharlau.

The preparation consists of a two-step process, in which first of all the silica is functionalised with the coupling agent and after recovery, the anhydrous powder is reacted with a zinc precursor (zinc nitrate hexahydrate) to bind the zinc through the formation of the chelate with coordinating groups GC.

First Step

In a 50 ml flask, 1 g of $SiO_2$ powder was dispersed under stirring in 25 ml of toluene for ten minutes at 120° C. Then, an adequate amount of (3-aminopropyl)triethoxysilane was added to the dispersion and the reaction was maintained at 120° C. for 24 hours (reflux condition) under stirring. After cooling, the reaction product was recovered by centrifugation (9000 rpm, 10 minutes), washed twice with fresh toluene and dried in an oven at 80° C. overnight.

Different amounts of APTES were tested, as reported in the following Table 1, which were used for the preparation of samples with different zinc loads. The amount of silane was chosen based on the number of hydroxyl groups on the silica surface, adjusting the molar ratios between the hydroxyl groups and the silane.

TABLE 1

| Sample | APTES (mL) | APTES/OH ratio |
|---|---|---|
| SiO$_2$-APTES-1 | 0.132 | 1:6.25 |
| SiO$_2$-APTES-2 | 0.274 | 1:3 |
| SiO$_2$-APTES-3 | 0.394 | 1:2 |
| SiO$_2$-APTES-4 | 0.788 | 1:1 |

Second Step 1 g of the functionalised silica obtained in the first step (SiO$_2$-APTES) was dispersed in 50 mL of ethanol under stirring for 20 minutes at 100° C., so as to obtain a homogeneous suspension. Subsequently, an adequate amount of zinc precursor (Zn(NO$_3$)$_2$·H$_2$O) was added and the reaction was carried out for 2 hours. After cooling, the powder was separated by centrifugation (9000 rpm, 10 minutes) and washed twice with fresh ethanol. The powder was dried at 80° C. overnight. For each previously prepared functionalised silica (SiO$_2$-APTES-1, SiO$_2$-APTES-2, SiO$_2$-APTES-3, SiO$_2$-APTES-4), a constant molar ratio Zn/APTES of 0.7 was used. This quantity was chosen considering that in these experimental conditions, the maximum quantity of zinc that can bind to SiO$_2$-APTES corresponds to a molar ratio Zn/APTES equal to 0.5. A small excess of zinc with respect to the stoichiometric value was used to guarantee the reproducibility of the synthesis itself.

Preparation of Functionalised Sepiolite

In the case of sepiolite, an activation step was added to the process described above to improve the surface reactivity of sepiolite and increase its reactivity. Before the functionalisation of sepiolite with APTES (first step of the previous process), sepiolite was washed in an alkaline solution as follows.

1 g of sepiolite was dispersed in 50 ml of 0.03 M NaOH solution and kept under stirring at room temperature for 24 hours. The sepiolite was recovered by centrifugation (9000 rpm, 30 minutes) and washed with fresh water until it reached a neutral pH (pH=7) in the washing solution. The powder was dried using the lyophilisation method. After this treatment, the same functionalisation steps with silane (APTES) and reaction with the zinc precursor were performed.

Characterisation of the Materials Obtained

Figure 2:
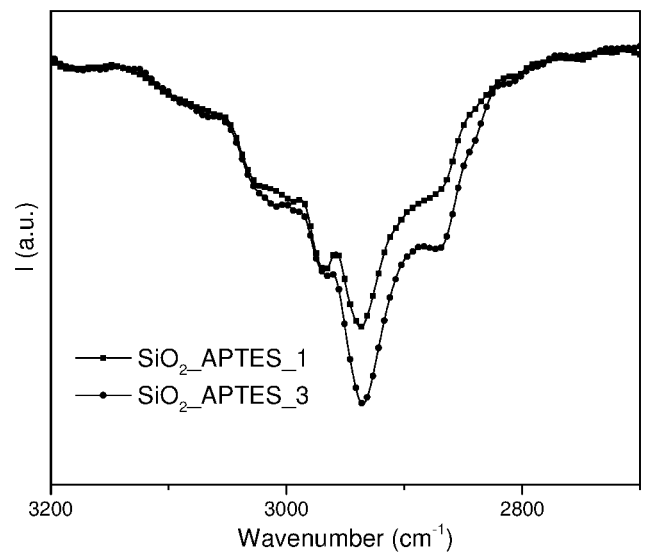
FIG. 2 shows the FTIR ATR spectrum of two silica samples functionalised with the coupling agent described in example 1.

FIG. 2 shows the FTIR ATR spectrum obtained with the SiO$_2$-APTES-1 and SiO$_2$-APTES-3 materials. In the SiO$_2$-APTES samples two peaks at 2864 and 2932 cm$^{-1}$ are always visible, attributed to the symmetrical and asymmetrical stretching of the CH$_2$ groups, typical of the propyl chains of the APTES molecules. The intensity of these two peaks depends strictly on the amount of APTES used in the reaction, as shown in FIG. 2. This observation provided a first indication that the reaction proceeds proportionally with respect to the amount of APTES used in the reaction itself.

Moreover, from the comparison between the SiO$_2$-APTES spectra and the pure silica (SiO$_2$), not shown in FIG. 2, the shift of the peak at 958 cm$^{-1}$ was observed, attributable to the stretching of the Si—OH bond of the hydroxyl groups of the silica surface, at higher wave numbers. The peak becomes a shoulder of the main peak at 1068 cm$^{-1}$, due to the formation of the Si—O—Si bond, following the partial substitution reaction of the silica hydroxyl groups with other molecules, confirming the reaction between the APTES molecules and the surface of silica.

Figure 3:
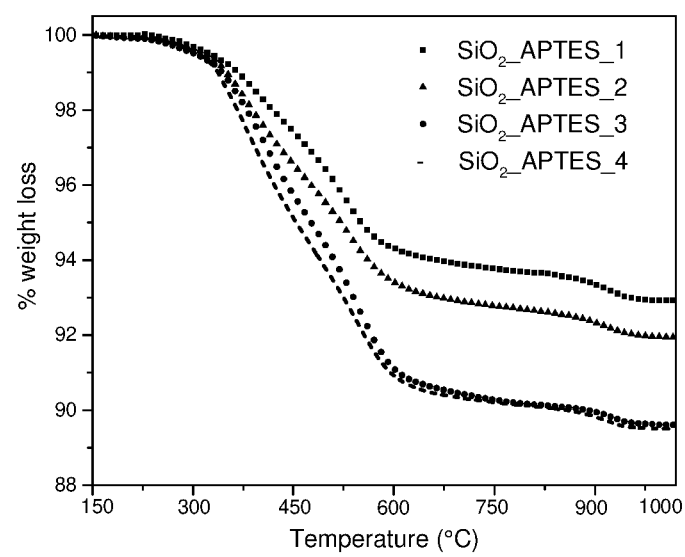
FIG. 3 shows the TGA spectrum of four silica samples functionalised with the coupling agent described in example 1.
Figure 4:
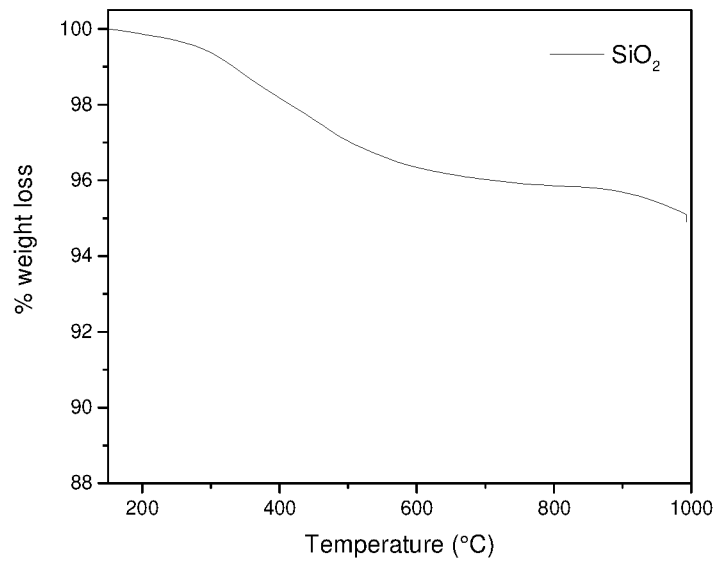
FIG. 4 shows the TGA spectrum of the reference sample $SiO_2$ as described in example 1.

FIG. 3 shows the TGA spectrum obtained with the SiO$_2$-APTES-1, SiO$_2$-APTES-2, SiO$_2$-APTES-3 and SiO$_2$-APTES-4 materials, while FIG. 4 shows the TGA spectrum obtained with the reference sample SiO$_2$.

The following Table 2 shows the total weight loss after treatment from 150° to 1000° C.

TABLE 2

| Sample | % weight loss 150-1000° C. |
|---|---|
| SiO$_2$ | 4,102 |
| SiO$_2$-APTES-1 | 7,087 |
| SiO$_2$-APTES-2 | 8,023 |
| SiO$_2$-APTES-3 | 10,366 |
| SiO$_2$-APTES-4 | 10,458 |

The TGA analysis allowed confirming the effective functionalisation of silica following the reaction with APTES. This was possible because the weight loss between 150° C. and 1000° C. is associated with the presence of organic material on the silica surface: comparing the TGA spectra of the SiO$_2$-APTES samples with the reference sample SiO$_2$, an increase in the weight loss associated with these samples is observed, confirming the presence of organic material due to the functionalisation reaction.

This weight loss is greater with the increase in the quantity of silane used, as expected, with the exception of the comparison between sample 3 and sample 4. In the latter, despite the use of a double amount of silane, a percentage weight loss was recorded that was completely similar to the sample 3. It is believed that this is due to the fact that starting from the sample 3, the silica has reached a condition of surface saturation, such that no silane molecule is able to further bind with the silica surface, totally covered with APTES molecules.

The following Table 3 also shows the degree of surface coating (expressed as a percentage by weight) and the surface density of APTES molecules (expressed in number/$nm^2$).

TABLE 3

| Sample | Coating degree surface (% by weight) | n. APTES molecules/$nm^2$ | Reaction yield (%) |
|---|---|---|---|
| $SiO_2$-APTES-1 | 3.2 | 2.3 | 99 |
| $SiO_2$-APTES-2 | 6.2 | 4.4 | 95 |
| $SiO_2$-APTES-3 | 7.6 | 5.2 | 76 |
| $SiO_2$-APTES-4 | 7.8 | 5.3 | 41 |

The values reported in table 3 were obtained starting from the following formulas (1) and (2):

$$n_R = \frac{2 * \Delta w_{150-1000°C.} - n_{OH} * w_{SiO_2(1000°C.)} * MW_{H_2O}}{2MW_R - MW_{H_2O}} \quad (1)$$

$$\frac{n \cdot \text{molcules}}{\text{surface area (nm}^2)} = \frac{N_A * n_R}{\frac{n_{SiO_2} * MW_{SiO_2}}{S_{BET}} * 10^{18}} \quad (2)$$

where $n_R$ is the number of moles of APTES, $\Delta w_{150-100°\,C.}$ is the weight loss recorded in the range 150-1000° C., $n_{OH}$ is the number of surface hydroxyl groups of silica (determined by TGA analysis performed on pure silica), $w_{SiO2\,(1000°\,C.)}$ is the silica mass measured at 1000° C., $MW_{H2O}$ is the molecular weight of water, $MW_R$ is the molecular weight of the APTES residue, NA is the Avogadro number, $MW_{SiO2}$ is the molecular weight of silica (60 g $mol^{-1}$) and SBET is the surface area of silica (160 $m^2$/g).

The data of Table 3 demonstrate that the number of APTES molecules on silica can be suitably modified between 2 and 6 molecules/$nm^2$, corresponding to a degree of surface coating between 3 and 8% by weight, with high reaction yields (>80%). Above 8% by weight, the reaction yield decreases considerably, highlighting that this value corresponds to the weight value with which the silica surface can be considered saturated.

The following Table 4 compares the percentage values of nitrogen calculated with the data deriving from the TGA analysis with those obtained with the data deriving from the CHNS analysis.

TABLE 4

| Sample | N % (TGA) | N % (CHNS) |
|---|---|---|
| $SiO_2$-APTES-1 | 0.75 | 0.90 |
| $SiO_2$-APTES-2 | 1.45 | 1.38 |
| $SiO_2$-APTES-3 | 1.78 | 1.51 |
| $SiO_2$-APTES-4 | 1.84 | 2.01 |

Considering the experimental error, the N % values are completely comparable, providing further confirmation of the formation of the bond between APTES and silica.

The following Table 5 shows the values of surface area BET of pure silica ($SiO_2$) and of two $SiO_2$-APTES-1 and $SiO_2$-APTES-3 samples.

TABLE 5

| Sample | BET ($m^2$/g) |
|---|---|
| $SiO_2$ | 160 |
| $SiO_2$_APTES_1 | 107 |
| $SiO_2$_APTES_3 | 107 |

Figure 5:
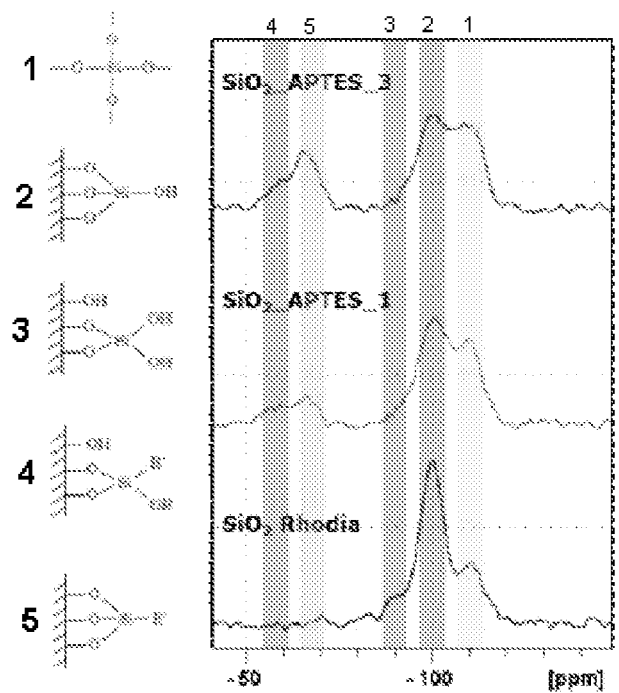
FIG. 5 shows the solid state NMR spectrum of the pure silica reference sample ($SiO_2$) and of two silica samples functionalised with the coupling agent described in example 1.

For both functionalised samples, there is a decrease in the surface area value due to the presence of APTES molecules on the surface, which partially cover the pores and micropores of the silica particles, reducing the total surface area measured. FIG. 5 illustrates the solid-state NMR spectrum of pure silica ($SiO_2$) and two $SiO_2$-APTES-1 and $SiO_2$-APTES-3 samples. The spectrum shows that the functionalised samples have the same spectrum as pure silica, with the addition of the T1 and T2 peaks due to the presence of APTES bound to the silica surface.

It has been observed that the quantity of T units increases with the percentage of functionalisation, while the Q3/Q4 ratio decreases significantly from pure silica to functionalised silica, suggesting a decrease in superficial Si—OH groups following functionalisation. It was also observed that the T2/T3 ratio decreases as the quantity of APTES increases, suggesting that the APTES molecules are probably bound to silica by two or three bonds per molecule. Finally, comparing the T/Q ratio, a semi-quantitative analysis was obtained, which showed that the APTES signals increase proportionally with the nominal concentration.

The following Table 6 shows the results of the ICP analysis, in particular the quantities of zinc actually bound on two $SiO_2$-APTES-2-Zn and $SiO_2$-APTES-3-Zn samples using different amounts of zinc, calculated on the basis of molar ratio between silane molecules in the starting sample and zinc molecules.

TABLE 6

| Sample | n(Zn)/n(APTES) | % wt Zn (nominal) | % wt Zn (actual) |
|---|---|---|---|
| $SiO_2$-APTES-2-Zn | ½ | 2.2 | 2.2 ± 0.2 |
|  | 1 | 4.4 |  |
|  | 2 | 8.8 |  |
| $SiO_2$-APTES-3-Zn | ½ | 3.4 | 3.1 ± 0.2 |
|  | 1 | 6.8 |  |
|  | 2 | 11.3 |  |

The data in Table 6 clearly show that the amount of zinc present in the final sample does not depend on the amount of zinc precursor selected, but rather on the amount of silane previously bound to silica. Using significantly excess amounts of zinc nitrate, the final weight percentage remains unchanged. Furthermore, the Zn:APTES ratio is always 1:2, for each sample of $SiO_2$-APTES. This result provided a first indication of the binding of zinc as an isolated centre to two APTES molecules via the amino group, with two other free positions around the zinc, probably occupied by anions present in the synthesis conditions, such as OH groups or $NO_3$ groups.

Figure 6:
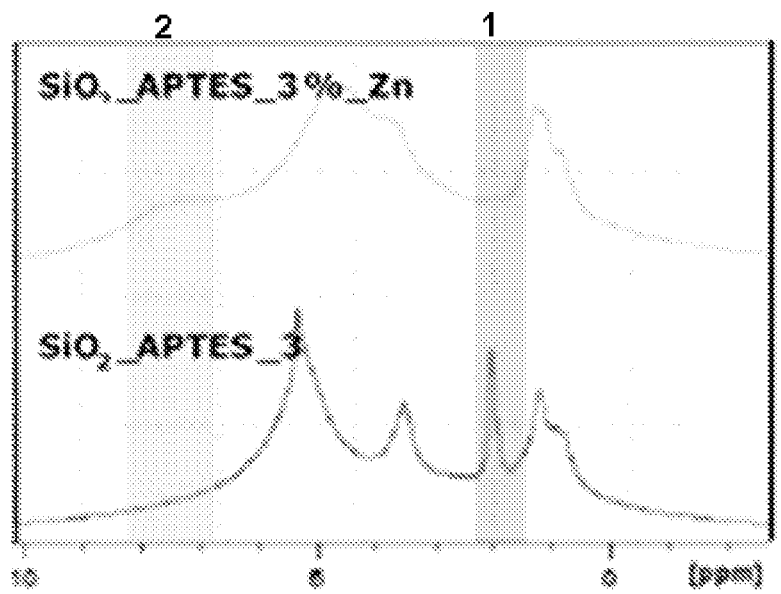
FIG. 6 shows the NMR spectrum of the silica sample functionalised with the coupling agent and that of the same sample after forming the chelate with zinc, as described in example 1.

Further experimental confirmation of the bond between zinc and amino groups came from the examination of NMR spectra. FIG. 6 shows the spectrum of the starting $SiO_2$-APTES-3 sample and that of the final $SiO_2$-APTES-3-Zn sample. The band 1 present at 1.9 ppm, attributable to $NH_2$ groups, disappears following the interaction with zinc, in favour of a wider band 2 which appears at 7.3 ppm, precisely because of the interaction of the amino groups with zinc precursor. The information obtained from this analysis confirmed the amine-zinc interaction at the base of the formation of the zinc complexes on the silica surface.

Figure 7:
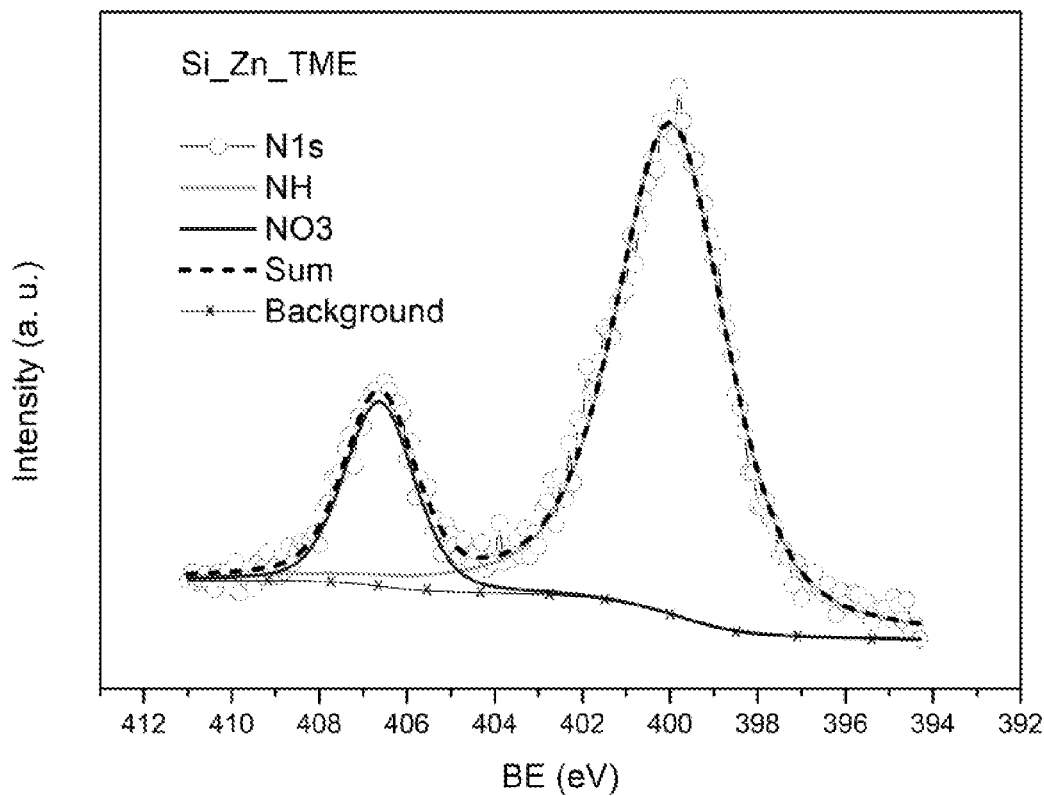
FIG. 7 shows the spectra obtained from XPS analysis of a silica sample functionalised with the zinc-chelated coupling agent, as described in example 1.

FIG. 7 shows the spectra obtained from XPS analysis, highlighting the photoemission region of the N1S signal for a $SiO_2$-APTES-Zn sample.

FIG. 7 shows that the recorded nitrogen signal is composed of two main components, one organic (relative to the amino group of the ligand) and one inorganic (deriving from the nitrate group). Through normalisation it was possible to derive the percentage of the two contributions and thus derive the quantitative ratios between the various elements.

Of particular interest are the NH/Zn and $Zn/NO_3$ ratios, reported in the following table 7.

TABLE 7

| Sample | NH/Zn | $Zn/NO_3$ |
|---|---|---|
| $SiO_2$-APTES-3-Zn | 1.7 | 1.5 |

The value of the NH/Zn ratio, which is approximately equal to 2, as expected within the experimental error, confirmed the coordination of each zinc atom with two APTES molecules by amino groups.

Furthermore, the value of the $Zn/NO_3$ ratio confirmed that at least one of the other two free zinc positions is occupied by $NO_3$ groups, deriving from the synthesis of zinc nitrate. It has therefore been confirmed that zinc is an isolated centre, coordinated to only two amino groups and actually has two free positions, in which labile ligands are present such as the $NO_3$ group, easily replaceable in subsequent reactions with other molecules.

Finally, the UV-Visible spectroscopic analysis confirmed the absence of the typical zinc oxide absorption band, present around 370 nm, thus confirming the total absence of zinc oxide on the silica surface and in the system as a whole.

A sample of $SiO_2$-APTES-3-Zn was subjected to the same analyses after model vulcanisation reaction, using a standard compound, performed in TME (2,3-dimethyl-2-butene) at 120° C., in the presence of CBS (N-cyclohexyl-2-benzothiazole sulphenamide) and sulphur, with an optimal vulcanisation time of 20 minutes.

The NMR spectrum of the sample after vulcanisation proved to be completely similar to the sample spectrum before the reaction, with the large band at 7.3 ppm still visible, due to the interaction between zinc and amino groups, as discussed in relation to FIG. 6.

The NH/Zn and $Zn/NO_3$ ratios, derivable from the XPS analysis and reported in the following table 7bis, confirmed that the NH/Zn ratio remains almost constant following the model vulcanisation reaction in TME, indicating the absence of release of zinc from the vulcanised material, while they have shown an increase in the $Zn/NO_3$ ratio, indicating the decrease of $NO_3$ groups bonded to the zinc centres, following the reaction.

TABLE 7bis

| $SiO_2$-APTES-3-Zn sample | NH/Zn | $Zn/NO_3$ |
|---|---|---|
| Pre-vulcanisation | 1.7 | 1.5 |
| Post-vulcanisation | 1.5 | 2.3 |

In view of the results obtained, it has therefore been demonstrated that the zinc centres, although actively participating in the vulcanisation reaction as activators, remain stable and bonded to the silane molecules present on the silica surface. Furthermore, the participation of the zinc centre in the reaction was further demonstrated by the reduction of the nitrate groups coordinated to the zinc following the reaction, showing on the one hand the weakness of these bonds with respect to the bond with the amino group and on the other the possible interaction of zinc with other chemical agents involved in the reaction.

Example 2

Preparation of the Elastomeric Compound

The following Table 8 shows the formulations of the reference compound (R1) comprising silica (43 phr) and zinc oxide (equal to 1.49 phr of $Zn^{2+}$) added separately and of the compound according to the present invention (I1) in which were introduced 49.4 phr of $SiO_2$-APTES-3-Zn prepared as described in example 1, equal to 1.49 phr of $Zn^{2+}$, 3.42 phr of APTES, 0.96 phr of nitrate, 0.54 phr of hydroxyl groups (—OH) and 43 phr of silica.

TABLE 8

| Component | R1 | I1 |
|---|---|---|
| Step 1 | | |
| IR | 100 | 100 |
| Silica | 43.0 | — |
| $SiO_2$-APTES-3-Zn | — | 49.4 |
| Silane | 3.44 | — |
| Stearic acid | 2 | — |
| 6PPD | 2 | 2 |
| ZnO | 1.85 | — |
| Step 2 | | |
| CBS | 1.6 | 1.6 |
| Sulphur (67%) | 3 | 3 |

IR: high-cis synthetic polyisoprene (min. 96%), obtained by polymerisation in solution with Ziegler/Natta catalyst; Supplier NIZHNEKAMSKNEFTECHIM EXPORT;
Silica: ZEOSIL 1115 MP (specific surface area BET 95-120 $m^2/g$, white microbeads obtained by precipitation from sodium silicate solutions with sulphuric acid. It does not contain crystalline silica. Supplier SOLVAY RHODIA OPERATIONS
Stearic acid: Supplier TEMIX OLEO SRL
6PPD: N-(1,3-dimethylbutyl)-N'-phenyl-p-phenylenediamine, Supplier: SOLUTIA/EASTMAN
ZnO (80): 80% zinc oxide, 20% polymeric binder and dispersing agent, Supplier LANXESS ADD
Silane: TESPD Bis-(3-triethoxy-silyl-propyl)disulphide, Supplier JINGZHOU JIANG-HAN FINE CHEM
CBS: N-cyclohexyl-2-benzothiazilsulphenamide, cyclohexylamine content <1%, DUSLO Supplier
Sulphur: Crystex OT33 amorphous sulphur, insoluble in $CS_2$ and in toluene. Treated with 33% hydrotreated heavy naphthenic distillate (petroleum), Supplier EASTMAN.

All the components, except for sulphur and the accelerant (CBS) were mixed together in an internal mixer (model Pomini PL 1.6) for about 5 minutes (1 st step). As soon as the temperature reached 145+5° C., the elastomeric blend was unloaded. Sulphur and the accelerant (CBS) were then added and mixing was performed in an open roll mixer (2nd step).

Using the compounds of table 8, specimens were made on which the MDR rheometric measurements were performed.

The results are summarised in the following Table 9.

TABLE 9

| | R1 | I1 | Δ I1 vs R1 (%) |
|---|---|---|---|
| MH | 22.2 | 28.8 | +30 |
| t50 | 2.05 | 0.52 | −75 |
| t100 | 4.40 | 2.50 | −43 |

The results of Table 9 show the greater reactivity and the greater maximum torque (MH) of the compound of the invention (I1) compared to the reference compound.

Example 3

Preparation of the Elastomeric Compound

The following Table 8 shows the formulations of the reference compound (R32) comprising silica (43 phr) and zinc oxide (equal to 1.49 phr of $Zn^{2+}$) added separately, of the reference compound R3 comprising silica (43 phr), zinc oxide (equal to 1.49 phr of $Zn^{2+}$), and silane APTES (3.56 phr) added separately, and of the compound according to the present invention (I2) in which were introduced 49.4 phr of $SiO_2$-APTES-3-Zn prepared as described in example 1, equal to 1.49 phr of $Zn^2P$, 3.42 phr of APTES, 0.96 phr of nitrate, 0.54 phr of hydroxyl groups (—OH) and 43 phr of silica.

TABLE 10

| Component | R2 | R3 | I2 |
|---|---|---|---|
| Step 1 | | | |
| IR | 100 | 100 | 100 |
| Carbon black | 15.00 | 15.00 | 15.00 |
| Silica | 43.0 | 43.0 | — |
| $SiO_2$-APTES-3-Zn | — | — | 49.4 |
| APTES | — | 3.56 | — |
| Silane | 3.44 | — | — |
| Stearic acid | 2.0 | 2.0 | 2.0 |
| ZnO | 1.85 | 1.85 | — |
| 6PPD | 3.0 | 3.0 | 3.0 |
| Wax | 1.0 | 1.0 | 1.0 |
| Step 2 | | | |
| DCBS | 1.8 | 1.8 | 1.8 |
| PVI | 0.4 | 0.4 | 0.4 |
| Sulphur (67%) | 3.0 | 3.0 | 3.0 |

IR: high-cis synthetic polyisoprene (min. 96%), obtained by polymerisation in solution with Ziegler/Natta catalyst; Supplier NIZHNEKAMSKNEFTECHIM EXPORT;
Carbon black: N375 Carbon Black, Supplier CABOT
Silica: ZEOSIL 1115 MP (specific surface area BET 95-120 m$^2$/g, white microbeads obtained by precipitation from sodium silicate solutions with sulphuric acid. It does not contain crystalline silica. Supplier SOLVAY RHODIA OPERATIONS
APTES: 3-aminopropyl)triethoxysilane (99%), Supplier Sigma Aldrich
Silane: TESPT Bis-(3-triethoxy-silyl-propyl)-tetrasulphide, Supplier Evonik
Stearic acid: Supplier TEMIX OLEO SRL
ZnO (80): 80% zinc oxide, 20% polymeric binder and dispersing agent, Supplier LANXESS ADD
6PPD: N-(1,3-dimethylbutyl)-N'-phenyl-p-phenylenediamine, Supplier: SOLUTIA/EASTMAN
Wax: RIOWAX BN01, mixture of n-and iso-paraffins, Supplier: SER
DCBS: N,N'-dicyclohexyl-2-benzothiazilsulphenamide, cyclohexyl amine content <1%, Supplier LANXESS ADD
PVI: N-cyclohexyl thiophthalimide, Supplier Solutia
Sulphur: Crystex OT33 amorphous sulphur, insoluble in $CS_2$ and in toluene. Treated with 33% hydrotreated heavy naphthenic distillate (petroleum), Supplier EASTMAN.

All the components, except for sulphur, the retardant (PVI) and the accelerant (CBS) were mixed together in an internal mixer (model Pomini PL 1.6) for about 5 minutes (first step). As soon as the temperature reached 145+5° C., the elastomeric blend was unloaded. Sulphur, the retardant (PVI) and the accelerant (CBS) were then added and mixing was performed in an open roll mixer (second step).

Using the compounds of table 10, specimens were made on which the MDR rheometric measurement (30 minutes at 151° C. and 10 minutes at 170° C.) and the measurement of static and dynamic mechanical properties after vulcanisation for 30 minutes at 151° C. were performed.

The results are summarised in the following Tables 11-13.

TABLE 11

MDR 30 minutes at 151° C.

| | R2 | R3 | I2 | Δ R3 vs R2 (%) | Δ I2 vs R2 (%) | Δ I2 vs R3 (%) |
|---|---|---|---|---|---|---|
| MH[dN/m] | 28.06 | 30.86 | 40.95 | 9.98 | 45.94 | 32.70 |
| TS1[min] | 0.79 | 0.68 | 0.52 | −13.92 | −34.18 | −23.53 |
| TS2[min] | 2.52 | 0.97 | 0.82 | −61.51 | −67.46 | −15.46 |
| T05[min] | 1.08 | 0.74 | 0.75 | −31.48 | −30.56 | 1.35 |
| T30[min] | 5.85 | 1.85 | 2.3 | −68.38 | −60.68 | 24.32 |
| T60[min] | 7.77 | 3.19 | 4.35 | −58.94 | −44.02 | 36.36 |
| T90[min] | 11.42 | 5.32 | 7.58 | −53.42 | −33.63 | 42.48 |
| T95[min] | 12.67 | 5.93 | 8.55 | −53.20 | −32.52 | 44.18 |
| T100[min] | 16.26 | 7.49 | 11.26 | −53.94 | −30.75 | 50.33 |

TABLE 12

MDR 10 minutes at 170° C.

| | R2 | R3 | I2 | Δ R3 vs R2 (%) | Δ I2 vs R2 (%) | Δ I2 vs R3 (%) |
|---|---|---|---|---|---|---|
| ML[dN/m] | 3.3 | 6.97 | 5.95 | 111.21 | 80.30 | −14.63 |
| MH[dN/m] | 26.96 | 27.98 | 41.3 | 3.78 | 53.19 | 47.61 |
| TS1[min] | 0.52 | 0.46 | 0.3 | −11.54 | −42.31 | −34.78 |
| TS2[min] | 0.85 | 0.53 | 0.41 | −37.65 | −51.76 | −22.64 |
| T05[min] | 0.59 | 0.47 | 0.39 | −20.34 | −33.90 | −17.02 |
| T30[min] | 1.65 | 0.73 | 0.82 | −55.76 | −50.30 | 12.33 |
| T60[min] | 2.23 | 1.05 | 1.35 | −52.91 | −39.46 | 28.57 |
| T90[min] | 3.29 | 1.53 | 2.19 | −53.50 | −33.43 | 43.14 |
| T95[min] | 3.65 | 1.67 | 2.45 | −54.25 | −32.88 | 46.71 |
| T100[min] | 4.64 | 2.07 | 3.23 | −55.39 | −30.39 | 56.04 |

The results of Tables 11 and 12 show the greater reactivity of the compound of the present invention (I2) with respect to the standard reference compound R2 and to the comparison compound R3. It should in fact be observed that the values of minimum and especially maximum torque obtained from the compound I2 of the present invention are more than 50% higher than those obtained with the compounds R2 and R3, but despite this, T100 of I2 is lower by more than 30% compared to the T100 of R2. The higher T100 value of I2 compared to the T100 of R3 must be considered indicative of greater reactivity, in consideration of the different and higher value of MH.

The higher MH data of the compound I2 of the invention with respect to R2 and R3 have shown that the use of the compound of the present invention can be considered not only as a valid substitute for conventional zinc oxide with a lower zinc release in the environment, but also as a means to reduce the amount of zinc in the raw compound without affecting the mechanical performance of the vulcanised compound.

TABLE 13

Static mechanical properties

| | R2 | R3 | I2 | Δ R3 vs R2 (%) | Δ I2 vs R2 (%) | Δ I2 vs R3 (%) |
|---|---|---|---|---|---|---|
| Ca0.1[MPa] | 0.54 | 0.53 | 0.61 | −1.85 | 12.96 | 15.09 |
| Ca0.5[MPa] | 1.33 | 1.01 | 1.36 | −24.06 | 2.26 | 34.65 |
| Ca1[MPa] | 2.17 | 1.37 | 2.14 | −36.87 | −1.38 | 56.20 |
| Ca3[MPa] | 9.39 | 4.96 | 8.77 | −47.18 | −6.60 | 76.81 |
| CR[MPa] | 27.66 | 21.19 | 26.17 | −23.39 | −5.39 | 23.50 |

The results of Table 13 show for the compound of the invention (I2) higher values of the elongation modulus at 10% (Ca0.1) and at 50% (Ca0.5) with respect to both references (R2 and R3), resulting in greater predictive elasticity of better handling of the tyre.

The results obtained from the comparative compound R3 showed that the APTES amino silane added separately in the compound (i.e. not bound to silica in the zinc) considerably worsened the mechanical properties since it was not able to bind with the compound, while those obtained with the comparative compound surprisingly demonstrated that the use of the coupling agent of the present invention allowed substantially recovering the same values of Ca1, Ca3 and CR of the reference compound R2.

TABLE 14

Dynamic mechanical properties

| | | R2 | R3 | I2 | Δ R3 vs R2 (%) | Δ I2 vs R2 (%) | Δ I2 vs R3 (%) |
|---|---|---|---|---|---|---|---|
| 10° C. | E'[MPa], 1 Hz | 5.642 | 4.855 | 5.956 | −13.95 | 5.57 | 22.68 |
| | E'[MPa], 10 Hz | 6.142 | 5.579 | 6.716 | −9.17 | 9.35 | 20.38 |
| | Tanδ, 1 Hz | 0.125 | 0.237 | 0.19 | 89.60 | 52.00 | −19.83 |
| | Tanδ, 10 Hz | 0.155 | 0.249 | 0.22 | 60.65 | 41.94 | −11.65 |
| 23° C. | E'[MPa], 1 Hz | 5.504 | 4.602 | 5.632 | −16.39 | 2.33 | 22.38 |
| | E'[MPa], 10 Hz | 5.935 | 5.282 | 6.263 | −11.00 | 5.53 | 18.57 |
| | Tanδ, 1 Hz | 0.108 | 0.224 | 0.163 | 107.41 | 50.93 | −27.23 |
| | Tanδ, 10 Hz | 0.13 | 0.23 | 0.188 | 76.92 | 44.62 | −18.26 |
| 100° C. | E'[MPa], 1 Hz | 5.223 | 4.095 | 5.277 | −21.60 | 1.03 | 28.86 |
| | E'[MPa], 10 Hz | 5.452 | 4.492 | 5.564 | −17.61 | 2.05 | 23.86 |
| | Tanδ, 1 Hz | 0.066 | 0.15 | 0.096 | 127.27 | 45.45 | −36.00 |
| | Tanδ, 10 Hz | 0.076 | 0.166 | 0.106 | 118.42 | 39.47 | −36.14 |

The results of Table 14 show a surprising behaviour of the compound I2 of the present invention with respect to the comparative compound R3. In fact, the latter showed high tan δ values at all temperatures, and above too high at high temperatures, resulting in high hysteresis with heat dissipation and high rolling resistance at high speed, while on the contrary the compound I2 of the present invention showed a more limited and acceptable increase in the tan δ at high temperatures, but a significant increase at low temperatures, predictive of better grip on dry roads and better grip on wet roads.

Example 4

Preparation of Functionalised Silica

The process described in example 1 was repeated using the compound N-[3-(trimethoxysilyl)propyl]ethylenediamine (EDTMS) as a coupling agent (97%—Sigma-Aldrich). In the first step, 0.37 ml of ETDMS were used for every gram of $SiO_2$ to be functionalised. The amount of ETDMS was chosen based on the number of hydroxyl groups on the silica surface, to give a molar ratio between ETDMS and the hydroxyl groups of the silica surface (EDTMS/OH) equal to 1:2. In the second step, the amount of zinc precursor $(Zn(NO_3)_2 \cdot H_2O)$ was varied to obtain a molar ratio between zinc and ETDMS (Zn/EDTMS) equal to 1:2, 1:1 and 2:1. Three $SiO_2$-EDTMS-Zn samples were then obtained according to the following table 15.

TABLE 15

| Sample | Zn/ETDMS ratio |
|---|---|
| $SiO_2$-ETDMS-Zn-1 | 1:2 |
| $SiO_2$-ETDMS-Zn-2 | 1:1 |
| $SiO_2$-ETDMS-Zn-3 | 2:1 |

Characterisation of the Materials Obtained

The samples were characterised as described in example 1 by FTIR ATR spectroscopy to confirm the effective functionalisation of the material, TGA and CHNS to quantify the silane actually deposited on the silica surface, and ICP analysis to determine the amount of zinc bound to silica.

Figure 8:
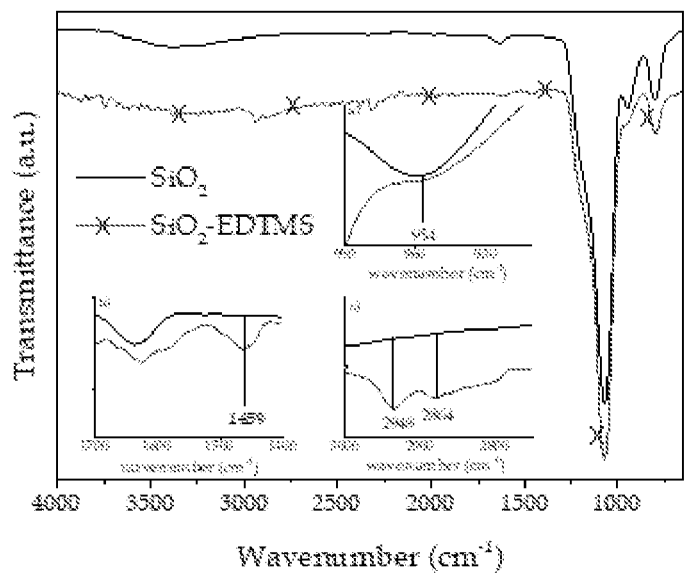
FIG. 8 shows the FTIR ATR spectrum of a silica sample functionalised with the coupling agent and of the pure silica reference sample (SiO$_2$), as described in example 4.

FIG. 8 shows the FTIR ATR spectrum obtained with the $SiO_2$-ETDMS material. From the comparison between the $SiO_2$-ETDMS spectra and the pure silica ($SiO_2$), the shift of the peak at 954 $cm^{-1}$ was observed, attributable to the stretching of the Si—OH bond of the hydroxyl groups of the silica surface, at higher wave numbers. The peak becomes a shoulder of the main peak at 1068 $cm^{-1}$, due to the formation of the Si—O—Si bond, following the partial substitution reaction of the silica hydroxyl groups with other molecules, confirming the reaction between the ETDMS molecules and the surface of silica.

Furthermore, in the $SiO_2$-ETDMS sample, two peaks are visible at 2948 and 2864 $cm^{-1}$, attributed to the symmetrical and asymmetrical stretching of the $CH_2$ groups, typical of the propyl and ethyl chains of the ETDMS molecules.

Finally, we observe the appearance of an additional peak at 1459 $cm^{-1}$, due to the secondary amino group of the ETDMS chain.

Figure 9:
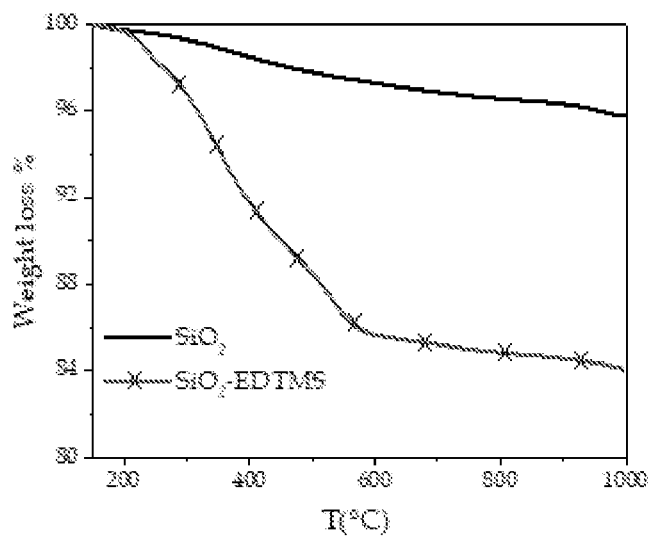
FIG. 9 shows the TGA spectrum of a silica sample functionalised with the coupling agent and of the pure silica reference sample (SiO$_2$), as described in example 4.

FIG. 9 shows the TGA spectrum obtained with the $SiO_2$-ETDMS material and with the reference sample $SiO_2$. The total weight loss of the $SiO_2$-ETDMS sample was 15.8%, compared to about 4% for the reference sample $SiO_2$.

The following Table 16 also shows the degree of surface coating (expressed as a percentage by weight) and the surface density of ETDMS molecules (expressed in number/$nm^2$)

TABLE 16

| Sample | Surface coating degree (% by weight) | n. ETDMS molecules/$nm^2$ | Reaction yield (%) |
|---|---|---|---|
| $SiO_2$-ETDMS | 15.3 | 6.2 | 90 |

The data of Table 16 show that the number of ETDMS molecules on silica was equal to about 6 molecules/$nm^2$, corresponding to a surface coating degree of about 15% by weight, with high reaction yields (90%).

The following Table 17 compares the percentage values of nitrogen calculated with the data deriving from the TGA analysis with those obtained with the data deriving from the CHNS analysis.

TABLE 17

| Sample | N % (TGA) | N % (CHNS) |
|---|---|---|
| $SiO_2$ | 0.00 | 0.00 |
| $SiO_2$-ETDMS | 4.25 | 3.74 |

Considering the experimental error, the N % values are completely comparable, providing further confirmation of the formation of the bond between ETDMS and silica.

The following Table 18 shows the results of the ICP analysis, in particular the quantities of zinc actually bound on the three samples obtained using different quantities of zinc, calculated on the basis of the molar ratio between zinc molecules and silane molecules in the starting sample (Zn/ETDMS).

TABLE 18

| Sample | Zn/ETDMS (nominal) | Zn (% by weight) | Zn (molecule/nm²) | Zn/ETDMS (molecule/nm²) |
|---|---|---|---|---|
| SiO₂-ETDMS-Zn-1 | 1:2 | 3.5 ± 0.2 | 3.58 ± 0.2 | 0.57 |
| SiO₂-ETDMS-Zn-2 | 1:1 | 5.9 ± 0.2 | 6.2 ± 0.2 | 1.00 |
| SiO₂-ETDMS-Zn-3 | 2:1 | 6.6 ± 0.2 | 7.1 ± 0.2 | 1.14 |

The ICP results show that EDTMS promotes a different behaviour compared to APTES and that the molar ratios Zn/silane vary according to the amount of zinc precursor used in the reaction. The first sample (molar ratio 1:2) is characterised by an effective molar ratio Zn/silane of approximately 0.5, suggesting that each zinc centre is coordinated with two silane molecules and consequently with four nitrogen atoms. The formation of a structure that involves two molecules of EDTMS for each zinc centre is reasonable considering the proximity of the silane molecules on the silica surface. Furthermore, the longer chain length of the EDTMS (compared with APTES) could promote greater chain mobility and greater flexibility, to coordinate zinc in a different way. In the other two samples prepared with a nominal Zn/EDTMS molar ratio of 1:1 and 1:2, the measured molar ratio Zn/EDTMS was approximately 1 in both cases, suggesting the coordination of each zinc centre with a molecule of EDTMS, probably with a chelation coordination.

Example 5

Preparation of the Elastomeric Compound

Using the same process described in example 2 and the compositions described in the following Table 19, a reference compound (R4) comprising silica (35 phr) and zinc oxide (equal to 1.49 phr of Zn²⁺) added separately and a compound according to the present invention (I3), comprising 42.7 phr of SiO₂-EDTMS-Zn prepared as described in example 4, equal to 1.49 phr of Zn²⁺, 6.5 phr of EDTMS and 35 phr of silica, were prepared.

TABLE 19

| Component | R4 | I3 |
|---|---|---|
| Step 1 | | |
| IR | 100 | 100 |
| Silica | 35.0 | — |
| SiO₂-APTES-3-Zn | — | 42.7 |
| Silane | 2.78 | — |
| Stearic acid | 2 | — |
| 6PPD | 2 | 2 |
| ZnO | 1.85 | — |
| Step 2 | | |
| CBS | 1.6 | 1.6 |
| Sulphur (67%) | 3 | 3 |

Using the compounds of table 19, specimens were made on which the MDR rheometric measurements were performed. The results are summarised in the following Table 20.

TABLE 20

| | R4 | I3 | Δ I3 vs R4 (%) |
|---|---|---|---|
| MH | 17.7 | 22.8 | +29 |
| t50 | 2.61 | 1.02 | −61 |
| t100 | 5.00 | 2.85 | −43 |

The results of Table 20 show the greater reactivity and the greater maximum torque (MH) of the compound of the invention (I1) compared to the reference compound.

The invention claimed is:

1. A compound represented by the following formula (II):

CB-O-ROS-GC-Zn    (II)

wherein CB represents the white filler, O represents one or more oxygen bridge bonds, ROS represents an organo-silane residue, GC represents one or more coordinating groups forming a chelate with zinc in ionic form, and Zn represents zinc in ionic form coordinated with the coordinating groups, wherein said coordinating groups GC are linear, branched or cyclic alkyl chains, comprising one or more heteroatoms inside or at the end of the alkyl chain.

2. A process for the preparation of the compound of formula (II) as claimed in claim 1, wherein said method comprises at least:
providing a white filler (CB)
providing a coupling agent having the following formula (I):

GR-ROS-GC    (I)

wherein GR represents one or more reactive groups capable of forming oxygen bridges with the surface of said white filler, ROS represents an organo-silane residue, and GC represents one or more coordinating groups,
providing a zinc compound (Zn²⁺),
reacting the white filler (CB) with one or more reactive groups (GR) of said compound of formula (I) so as to form oxygen bridges (—O—) between said white filler (CB) and said organo-silane residue (ROS), and
reacting one or more coordinating groups (GC) of said compound of formula (I) with the zinc compound so as to form a chelate, and
separating the resulting compound of formula (II) as claimed in claim 1.

3. The compound as claimed in claim 1 or the process as claimed in claim 2, wherein said white filler is selected from the group consisting of silica and silicates in the form of fibres, lamellae or granules.

4. The compound or process as claimed in claim 3, wherein said white filler is selected from the group consisting of bentonite, nontronite, beidellite, volkonskoite, hectorite, saponite, sauconite, vermiculite, sericite, sepiolite, and paligorskite, unmodified or modified by acid treatment and/or derivatized, and mixtures thereof.

5. The compound or process as claimed in claim 1, wherein said coordinating groups GC are functional groups represented by the formula —$C_nH_{2n}$—X$C_mH_{2m}$—Y, where n and m, equal or different from each other, are an integer from 1 a 6 inclusive and Y and X, equal or different from each other, are a group selected from mercapto and amino.

6. The process as claimed in claim 2, wherein said GR reactive groups are alkoxy groups having 1 to 4 carbon atoms.

7. The process as claimed in claim 2, wherein said coupling agent is represented by the general formula (Ia):

$(R)_3Si-C_nH_{2n}-X-C_mH_{2m}-Y$ (Ia)

wherein the R groups, equal to or different from each other, are selected from alkyl or alkoxy groups having 1 to 4 carbon atoms, provided that at least one of the R groups is an alkoxy group; n and m, equal or different from each other, are an integer from 1 to 6 inclusive; Y and X, equal or different from each other, are a group selected from mercapto and amino.

8. The process as claimed in claim 2, wherein said coupling agent is selected from the group consisting of (3-aminopropyl)triethoxysilane (APTES), N-(2-aminoethyl)-3-aminopropyl-trimethoxysilane (also known as N-[3-(trimethoxysilyl)propyl]ethylenediamine (EDTMS)), N-(2-aminoethyl)-3-aminopropyl-triethoxysilane, N-(2-aminoethyl)-3-aminopropyl-methyl-dimethoxysilane, 3-aminopropylmethyl-diethoxysilane, 3-ureidopropyl-trimethoxy silane, 3-ureidopropyl-triethoxysilane, N-cyclohexyl(aminomethyl) methyldiethoxy silane, N-cyclohexyl (aminomethyl) triethoxysilane, N-cyclohexyl-3-aminopropyl-trimethoxysilane, 3-(2-aminomethylamino) propyl-triethoxysilane, N-(n-butyl)-3-aminopropyltrimethoxy-silane, N-(2-aminoethyl)-3-aminopropylmethyldiethoxysilane, N-(2-aminoethyl)-3-aminoisobutyl-methyldimethoxysilane, 3-aminopropylmethyldimethoxysilane, 3-(2-(2-aminoethylamino)ethylamino)propyl-trimethoxysilane, N-(n-butyl)-3-aminopropyl-triethoxysilane, N, N-diethylaminopropyl-trimethoxysilane, N, N-dimethylaminopropyl-trimethoxysilane, butylaminemethyl-triethoxysilane, N-cyclohexyl(aminomethyl) trimethoxy-silane, 2-aminoethylaminomethyl-triethoxysilane, diethylaminomethyl-triethoxysilane, (3-mercaptopropyl)triethoxysilane and (3-mercaptopropyl)trimethoxysilane.

9. The process as claimed in claim 8, wherein said coupling agent is selected from the group consisting of (3-mercaptopropyl)trimethoxysilane, (3-aminopropyl)triethoxysilane (APTES), (3-aminodpropyl)trimethoxysilane, and N-(2-aminoethyl)-3-aminopropyltrimethoxysilane.

10. The process as claimed in claim 2, wherein said zinc compound is selected from the group consisting of zinc oxide, zinc hydroxide and organic or inorganic zinc salts.

11. The process as claimed in claim 10, wherein said organic or inorganic zinc salts are selected from the group consisting of zinc nitrate, zinc sulfate, zinc chloride, zinc bromide and zinc acetate.

12. A process for the preparation of a vulcanisable elastomeric compound for tyres, where said process comprises at least:
    a mixing step (1) of at least one elastomeric polymer and of at least one additive for elastomeric compounds, with the exception of a vulcanising agent, to give a non-vulcanisable elastomeric compound;
    a mixing step (2) of the non-vulcanisable elastomeric compound and of at least one vulcanising agent, to give a vulcanisable elastomeric compound, and
    a step of unloading of the vulcanisable elastomeric compound,
wherein the compound of formula (II) as claimed in claim 1 is added in at least one of said mixing steps (1) and (2).

13. A vulcanisable elastomeric compound obtained as claimed in the process of claim 12.

14. A tyre component comprising the vulcanisable compound of claim 13 or the vulcanised compound obtained by vulcanisation thereof.

15. A tyre for vehicle wheels comprising a component as claimed in claim 14.

* * * * *